(12) United States Patent
van Meurs

(10) Patent No.: US 7,088,861 B2
(45) Date of Patent: Aug. 8, 2006

(54) SYSTEM AND METHOD FOR CHINESE INPUT USING A JOYSTICK

(75) Inventor: Pim van Meurs, Kenmore, WA (US)

(73) Assignee: America Online, Inc., Dulles, VA (US)

( * ) Notice: Subject to any disclaimer, the term of this patent is extended or adjusted under 35 U.S.C. 154(b) by 49 days.

(21) Appl. No.: 10/775,663

(22) Filed: Feb. 9, 2004

(65) Prior Publication Data

US 2004/0223644 A1 Nov. 11, 2004

Related U.S. Application Data

(63) Continuation-in-part of application No. 10/205,950, filed on Jul. 25, 2002.

(60) Provisional application No. 60/503,323, filed on Sep. 16, 2003.

(51) Int. Cl.
*G06K 9/18* (2006.01)

(52) U.S. Cl. ....................... 382/185; 382/186

(58) Field of Classification Search ................ 382/159, 382/161, 165, 182, 185, 186–188, 189; 434/155, 434/159, 160, 161, 162, 165; 341/28; 715/541
See application file for complete search history.

(56) References Cited

U.S. PATENT DOCUMENTS

| | | | | |
|---|---|---|---|---|
| 5,187,480 A | * | 2/1993 | Thomas et al. ............... | 341/22 |
| 5,457,454 A | * | 10/1995 | Sugano ......................... | 341/22 |
| 5,649,223 A | * | 7/1997 | Freeman ....................... | 715/534 |
| 5,926,566 A | * | 7/1999 | Wang et al. ................... | 382/185 |
| 5,928,588 A | | 7/1999 | Nada et al. | |
| 5,933,526 A | * | 8/1999 | Sklarew ........................ | 382/189 |
| 2003/0006956 A1 | * | 1/2003 | Wu et al. ...................... | 345/156 |
| 2003/0184451 A1 | * | 10/2003 | Li .................................. | 341/22 |

OTHER PUBLICATIONS

Arnott, J.L., et al; *Probabilistic Character Disambiguation for Reduced Keyboards Using Small Text Samples*; Dept. Math & Comp. Sci.; Univ of Dundee, Dundee, Tayside, Scotland; AAC Augmentative and Alternative Communication; vol. 8, Sep. 1992; Copyright 1992 by ISAAC.
U.S. Appl. No. 2002/163,644, filed Nov. 7, 2002, Baker et al.
U.S. Appl. No. 2002/093,491, filed Jul. 18, 2002, Gillespie et al.

* cited by examiner

*Primary Examiner*—Joseph Mancuso
*Assistant Examiner*—Shefali Patel
(74) *Attorney, Agent, or Firm*—Michael A. Glenn; Glenn Patent Group

(57) ABSTRACT

A Chinese text entry system and method is provided to allow users to enter a character to a device such as a cellular phone or a PDA by adding a first few strokes required for the character using a joystick or its equivalent. By simply moving the joystick to add one or more strokes which are used to start writing a character, or in some case even before any stroke is added, a user can find a desired character from a displayed selection list. The selection list is context sensitive, varying depending on the last character entered, so that the user can be provided with the most possible candidates of the desired character.

48 Claims, 24 Drawing Sheets

SAMPLE CHARACTERS WITH DIFFERENT NUMBER OF STROKES

STROKE ORDER AND DIRECTION EXAMPLE

CHINESE STROKES

SAMPLE CHARACTERS WITH DIFFERENT NUMBER OF STROKES

STROKE ORDER AND DIRECTION EXAMPLE

| Joystick Motion | Function | Stroke Category | Numeric Representation |
|---|---|---|---|
| From 0 to 3 | Horizontal stroke | " | 1 |
| From 0 to 6 | Vertical stroke | ÿ | 2 |
| From 0 to 7:30 | Left falling stroke | ÿ | 3 |
| From 0 to 4:30 | Right falling stroke | ‒, ‒ | 4 |
| From 0 to 6 to 9 | Hooked stroke | ‒,‒, ‒, etc | 5 |
| From 0 to 9 | Delete | | |
| From 0 to 12 | Select | | |

SYSTEM AND METHOD FOR CHINESE INPUT USING A JOYSTICK

CROSS-REFERENCE TO RELATED APPLICATIONS

This application is a Continuation-in-Part of the co-pending U.S. patent application Ser. No. 10/205,950, titled CHINESE CHARACTER HANDWRITING RECOGNITION SYSTEM filed on Jul. 25, 2002, now a U.S. Pat. No. 6,970,599 and claims priority to the U.S. Provisional Patent Application Ser. No. 60/503,323, titled TEXT ENTRY METHODS AND SYSTEMS FOR ENTERING CHINESE TEXT USING A JOYSTICK, filed on 16 Sep. 2003, the contents of both of which are incorporated by reference here in their entirety by this reference thereto.

BACKGROUND OF THE INVENTION

1. Technical Field

This invention relates generally to text input technology. More particularly, the invention relates to a system and method that allows a user to use a joystick to input Chinese characters to a data processing device by entering only the first few strokes required to write each character, such that the user can perform Chinese input tasks in a fast, predictive way.

2. Description of the Prior Art

Chinese is written with characters known as hanzi (*字). Each character represents a syllable of spoken Chinese and also has a meaning. The characters were originally pictures of people, animals, or other things, but after several thousands years evolution they have become increasingly stylized and no longer resemble the things they represent. Many of the characters are actually compounds of two or more characters. To read Modern Chinese, one should know 2000–3000 characters. To read classical Chinese, knowledge of 5000–6000 characters is required. The largest Chinese dictionaries include 56,000 characters, but most of them are archaic, obscure or in rare variant forms.

A Chinese character (zi, 字) can be used as an independent single-character word. It can also be used in combination with other character or characters to constitute a word (ci, 词) or phrase (cizu, 词组). In daily life, two-character words are most frequently used. For example, the character "马" means horse and one can make many different words by appending another character to this character:

马(horse)+力(force, power)=马力(horse power);

马(horse)+房(house)=马房(stable, "horse house");

马(horse)+上(up, on)=马上(immediately, "on horse back");

马(horse)+夫(man, worker, husband)=马夫(groom,+"horse man");

马(horse)+路(road, street)=马路(road, street, "horse path");

A Chinese character is written using strokes following a specific sequence. There are many different ways to classify Chinese strokes. Traditionally, strokes are classified into eight basic forms as illustrated in FIG. 1. These eight basic strokes can be further grouped into five or six categories depending on different classification criteria.

A Chinese character may consist of between 1 and 64 stokes. The strokes for a character are always written in a specific sequence and each stroke is written in a determined direction. In dictionaries, characters are ordered partly by the number of stokes they contain. FIG. 2 shows various sample characters with different number of strokes and a sample four-stroke character with stroke ordinal number and stroke direction indicated.

In handwriting, it is essential to write a character in the correct sequence. This is not an issue for most of native Chinese speakers because the correct sequence is taught in the first grade and repeated in daily life. There are several basic rules for the sequence, for example: writing top before bottom, writing left before right, left vertical stroke before top horizontal stroke, bottom horizontal stroke last, center stroke before wings, horizontal strokes before intersecting vertical strokes, left-falling strokes before right-falling strokes, minor strokes (often) last, etc.

With the broad use of computers, many Chinese input systems and methods have been developed. The systems and methods are primarily classified into two categories: keyboard-coding and handwritten stroke recognition. In a keyboard-coding approach, such as in Three Corners, Goo, 5-stroke (Wubi), or Changjie, the user enters the strokes of a character by pressing on the corresponding key or keys and chooses a desired character from a set of candidate characters generated and presented on a display as matching alternatives. This approach can also be found in Motorola's CD928C cellular telephone.

In a handwritten stroke recognition approach, such as in Apple-SS, Tegic's T9, or Synaptics' QuickStroke, the user writes a stroke using a special device such as electronic pen or a stylus and the computer compares the user's stroke with a large number of collections in the database to recognize it. Some of those input systems, such as Zi Corporation's text input solution, have incorporated an intelligent indexing means to intuitively predict and display desired candidates. Some of those systems also include personalization and learning capabilities providing prediction of user-created terms and frequently used vocabulary.

The purpose of this invention is to provide an alternative Chinese input system and method which uses neither keyboard/telephone keys nor handwriting recognition devices, but uses a joystick or its functional equivalent as a primary input means.

SUMMARY OF INVENTION

A Chinese text entry system and method is provided to allow users to enter a character to a device, such as a cellular phone or a PDA, by adding a first few strokes required for the character using a joystick or its functional equivalent. The system and method is interactive, predictive, and intuitive to use. Compared to other existing solutions, the system and method of the invention can save users considerable time and efforts in Chinese text entry.

By moving the joystick to add one or two strokes which are used to start writing a Chinese character, users can find a desired character from a selection list of characters. The selection list is dynamically created based on the strokes added and the frequency of use of each of the characters starting with the strokes added.

Further, the selection list is context sensitive. When no stroke is added, a default selection list is displayed. The default selection list is typically the first ten most frequently used characters. The sequence of the default selection list changes according to the last character entered. The character that most likely to make a meaningful word by appending to the last character entered is put in the first choice place of the selection list. Similarly, whenever a stroke is added, the corresponding selection list is prioritized by the possibility of making a meaningful word and by the frequency of use.

In the preferred embodiment, the Chinese character input system includes: (1) an input means for associating a joystick motion with one of several basic stroke categories; (2) a collection means for organizing a selection list of characters that commonly start with one or more added strokes, the selection list of characters being displayed in a sequence based on frequency of use/last character entered; and (3) a selection means for selecting and entering the desired character from the selection list.

Typically, the strokes are classified into five basic categories, each of which is represented by a predefined joystick motion.

The collection means contains predefined stroke order information and one or more databases of Chinese characters. It also contains a display means to display a selection list of most frequently used characters when no stroke is entered or immediately after a character is selected and entered. The sequence for the selection list may be based on any of: (1) use frequency of a character; and (2) contextual relationship between the last character entered and each of the characters in the list.

The selection means includes a means for moving the cursor or its equivalent to select a character from the selection list and a means for entering the selected character. The means for moving the cursor and the means for entering a character can be button pressings or defined joystick motions.

The system may further include means for displaying a numeric or iconic representation of each stroke that is added and a full numeric or iconic representation of strokes for a Chinese character that is entered.

According to the preferred embodiment, a method for inputting Chinese characters includes the following steps:
  Add a first stroke represented by a predefined joystick motion;
  Categorize the added first stroke into one of the predefined number of categories;
  Find all characters which start with the added first stroke and rank them based on frequency of character use;
  Display a list of most frequently used characters of the found characters;
  If a desired character is in the list, select the desired character from the list and add it to the composition;
  If the desired character is not in the list, add a second stroke;
  Find most common characters that start with the first stroke and then the second stroke;
  Display another list of most frequently characters based on the first and the second stroke; and
  Add a third stroke if the desired word is not in the second list.

The method may further comprise the step of:
  Display a default list of characters immediately after a desired character was entered.

The default list is preferably the first ten most frequently used characters. The sequence of the list may be dynamically changed according to the contextual relationship between the last character entered and each of the ten characters.

The method may further include the steps of:
  Display a numeric or iconic representation for a stroke that is added; and
  Display full stroke numeric representation for a character that is entered.

DETAILED DESCRIPTION OF THE INVENTION

Figure 1:
FIG. 1 is a list of basic strokes for Chinese and a number of sample characters.
Figure 2:
FIG. 2 is a list of sample characters with different number of strokes.
Figure 2:
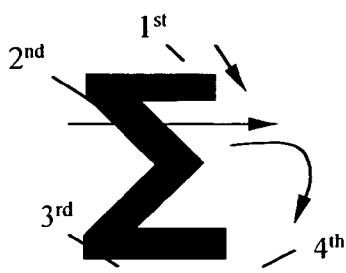
Figure 3:
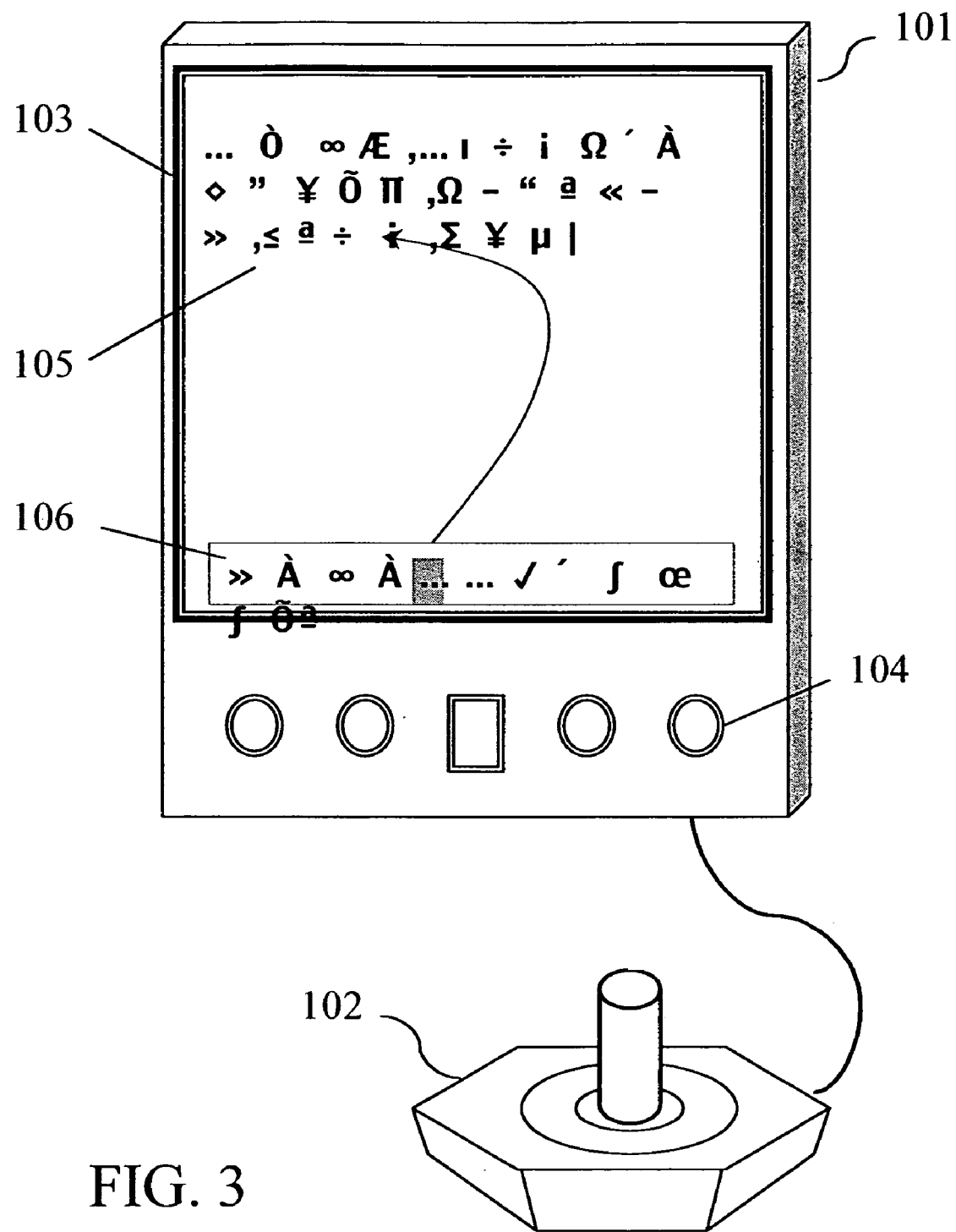
FIG. 3 is a schematic, pictorial diagram illustrating a device for inputting Chinese characters using a detached joystick according to the invention.

Reference is now made to the drawings, in particular to FIG. 3, which is a schematic, pictorial diagram illustrating a device 101 along with a detached joystick 102 where a Chinese input system according to the invention embodies. The device 101 has a screen 103 for displaying entered text and a number of buttons, such as the button 104 for various operations. The screen 103 includes a message display area 105 for displaying the entered textual information and a character selection area 106 where a selection list of characters is displayed.

Figure 4:
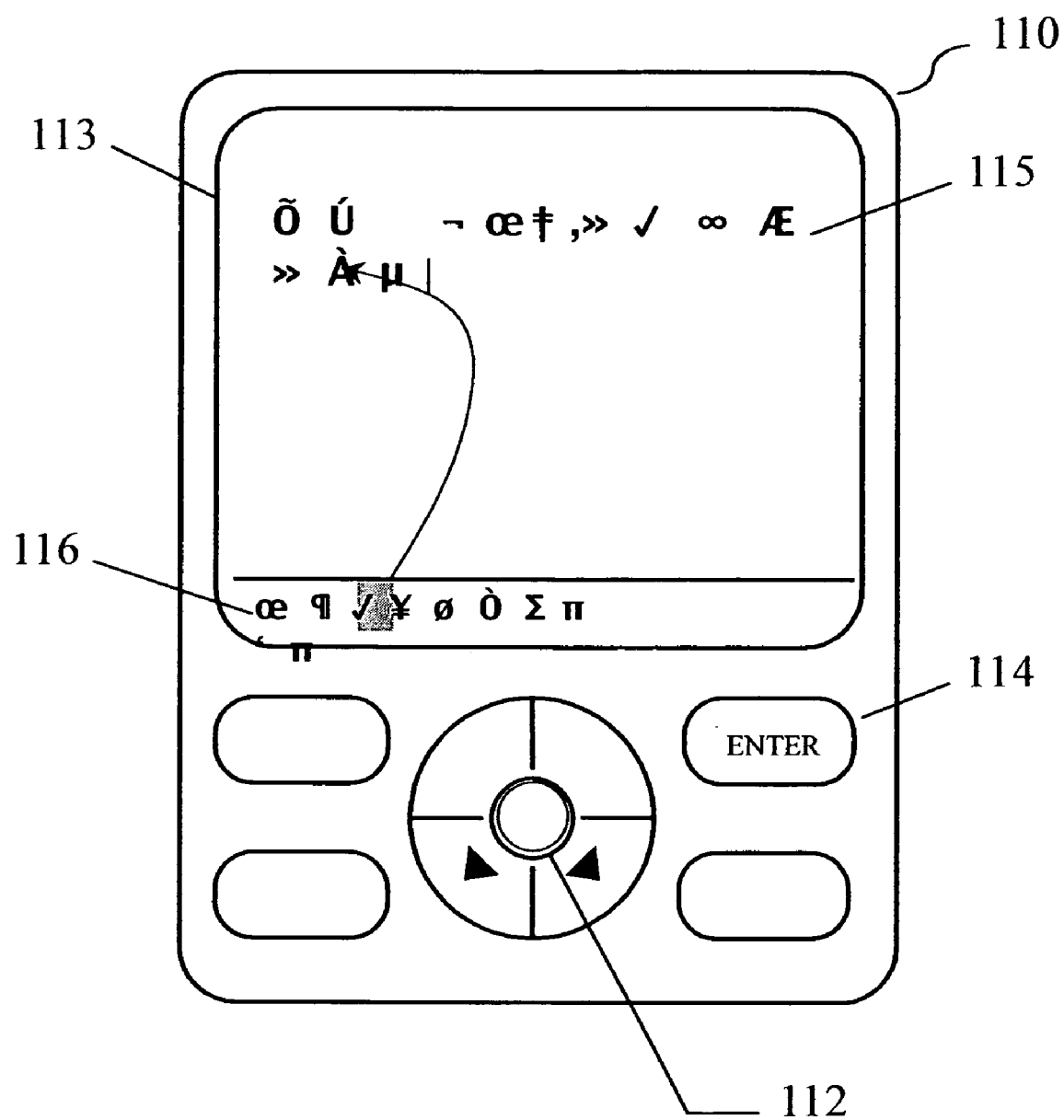
FIG. 4 is a schematic, pictorial diagram illustrating a device for inputting Chinese characters using an attached joystick according to the invention.

The joystick can be incorporated in the main body of the device. FIG. 4 illustrates a portable device 110 in which the Chinese input system embodies. The device 110 includes a joystick 112, a screen 113, and a number of operational buttons, one of which is an ENTER button 114. The screen 113 includes a message display area 115 and a word selection area 116.

Figure 5:
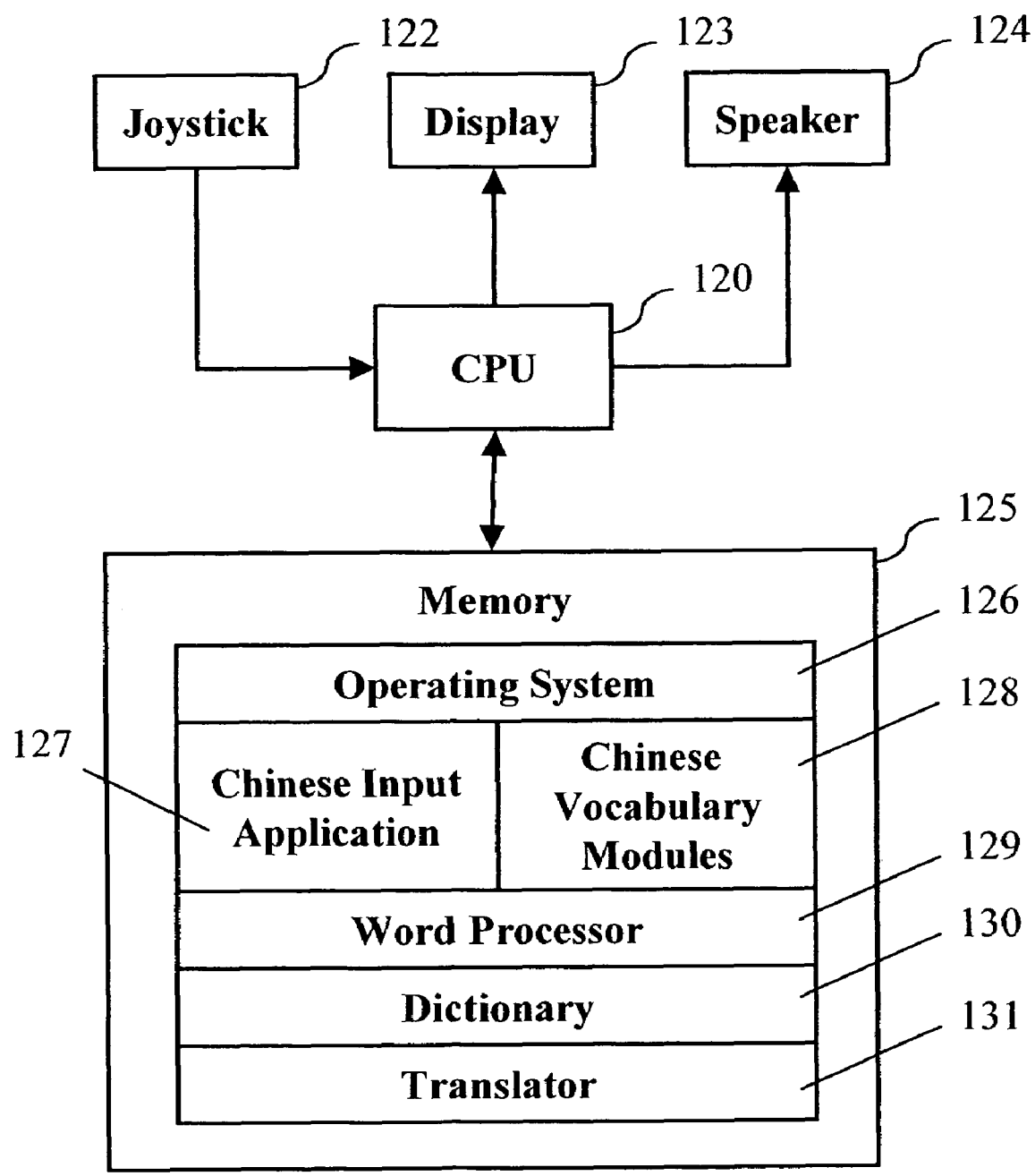
FIG. 5 is a block diagram illustrating the hardware components for a Chinese input system according to the invention.

The hardware components for the Chinese input system according to the invention are illustrated in FIG. 5, wherein the joystick 122 and the display 123 are communicatively coupled to at least one processor such as the CPU 120 through appropriate interfacing circuitry. Optionally, a speaker 124 may also be coupled to the CPU 120. The user inputs Chinese characters into the CPU 120 by moving the joystick 122 following a series of pre-defined motions. The CPU 120 manages all output to the display 123, and optionally, to the speaker 124. The system includes a memory 125 which includes a read only random access memory (usually called ROM) for storing application programs and a write/read random access memory (usually called RAM) available for the application programs' operations. Optionally, the memory 125 also includes an operating system 126 which handles the interface to peripheral hardware, schedules tasks, allocates storage, and presents a default interface to the user when no application program is running. The Chinese input application 127 and the associated Chinese vocabulary modules 128 are responsible for transforming joystick motions into desired Chinese characters which are displayed on the user's screen.

The Chinese vocabulary modules 128 include at least one database containing a number of Chinese characters and symbols, data of stroke sequence and stroke categories for each single character, data of use frequency of each single character, a number of multi-character words and phrases, data of use frequency of each multi-character word or phrase, first ten most frequently used characters in a sequence determined by use frequency, the first ten most frequently used characters in a sequence determined by frequency of each of the characters being used as the first character of a sentence or a half-sentence, first ten characters that are most frequently used characters as the first character of a sentence or a half-sentence, and other data and metadata for indexing and displaying a character. The database may further include common confusion sets so that the user may enter the alternative entries.

Optionally, the system may include one or more application programs that enable the user to add new phrases to the database for storing multi-character words or phrases.

Optionally, the system may include one or more application programs which count and calculate the user's usage of characters and phrases so that the data of the frequency of use can be dynamically changed. In this way, the more the user uses the system, the more adaptive the system is to the user's need and habit.

Optionally, the system may also include one or more application programs, such as a word processor 129, a software dictionary 130, and/or a foreign language translator 131. Speech synthesis software may also be provided as an application program which allows the device to function as a communication aid.

Figures 6, 7:
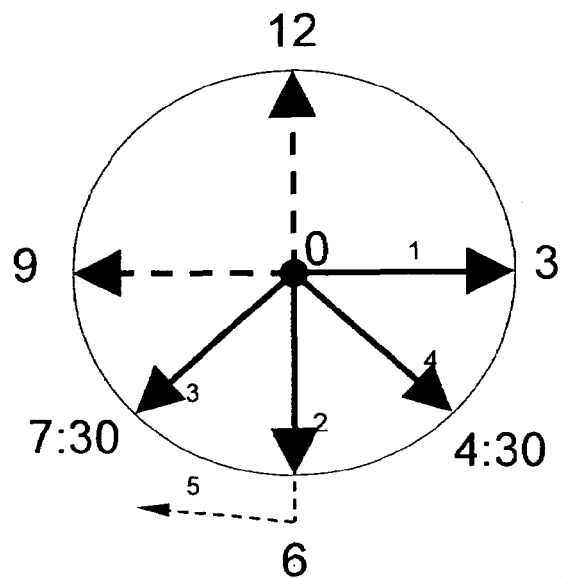
FIG. 6 is a schematic diagram illustrating the joystick's motion directions in two dimensions.
FIG. 7 is a table listing the definitions of the joystick motions and the corresponding strokes and the numeric representations for the strokes.

The joystick 122 is a device consisting of a small handheld stick that pivots about one end and transmits its angle in two dimensions to the CPU 120 via an input/output (I/O) interface. FIG. 6 illustrates various motion directions of the joystick 122. As defined in the table of FIG. 7, when the user moves the joystick 122 from position 0 to position 3, a signal indicating a horizontal stroke category, e.g. —is generated and sent to the CPU 120. Likewise, a motion from position 0 to position 6 represents a vertical stroke category, (e.g. |); a motion from position 0 to position 7:30 represents a left falling stroke category, (e.g. ノ); a motion from position 0 to position 4:30 represents a right falling stroke category, (e.g. ﹑,乀); and a motion from position 0 to position 6 then to position 9 represents a hooked stroke category, (e.g. 亅, →).
In addition, a motion from position 0 to position 9 may represent "delete" and a motion from position 0 to position 12 may represent "select."

Alternatively, the joystick 122 can be an isometric joystick in which the input depends on the force exerted rather than the position of the control. In that case, the joystick functions as a TrackPoint.

Note that FIG. 7 only shows five basic strokes and their numeric representations according to one criterion for classification. There are other classifications of the Chinese characters. The method and system according to the invention is applicable to any kind of classification.

The display 123 governs the appearance of the Chinese input interface, which includes a message display area and an area for displaying a selection list. Optionally, the display may further include an area for displaying the interface interpretation, either numeric or iconic, of the strokes entered by the user. When a stroke is added, the numeric or iconic representation of the stroke appears in the area. When a character is entered, the full stroke numeric or iconic representation is displayed. This is useful for assisting users to learn stroke orders and stroke categories.

Figure 8:
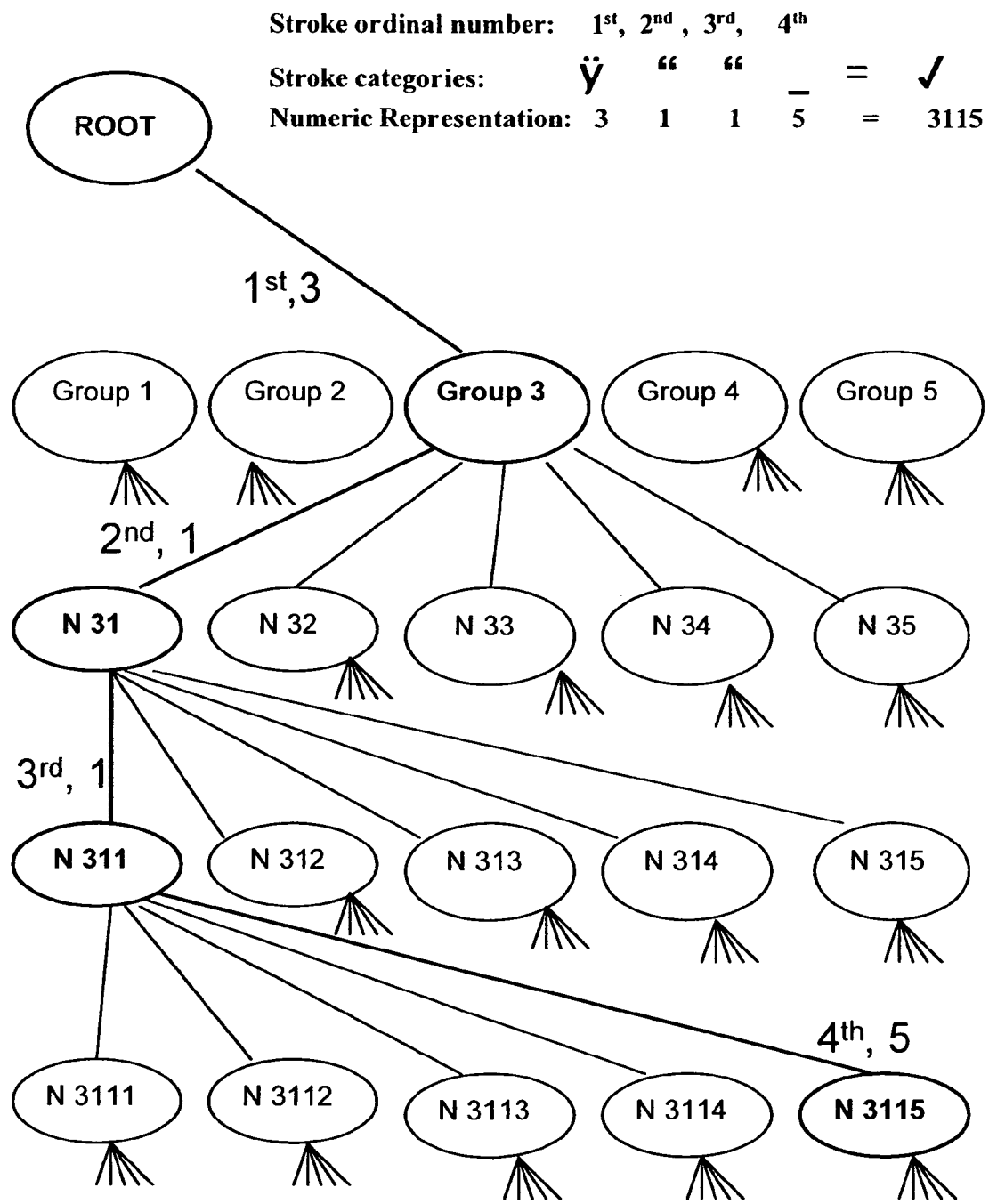
FIG. 8 is a schematic diagram illustrating an exemplary tree structure of a Chinese vocabulary module.

The Chinese vocabulary modules 128 include a database of Chinese characters which are organized in a tree structure. The root group includes the entirety of the characters, which are classified into five sub-groups: sub-group 1 includes all characters which start with a "1" stroke; sub-group 2 includes all characters which start with a "2" stroke; sub-group 3 includes all characters which start with the a "3" stroke; sub-group 4 includes all characters which start with a "4" stroke; and sub-group 5 includes all characters which start with a "5" stroke. Each sub-group includes five sub-sub-groups, each of which corresponds to one of the five categories as its second stroke. Because there are five stroke categories according to the preferred embodiment, each parent node in the tree structure is connected to five child nodes. Each path between a parent node and a child node represents one of the strokes required for a character. FIG. 8 illustrates an exemplary character object tree structure for a Chinese vocabulary module where a mapping path for a "毛3115" character is highlighted.

The Chinese vocabulary modules 128 also include a database for storing the first ten most frequently used characters and a large number of two-character words and multi-character words or phrases. This database is used for prioritizing the selection list based on the contextual relationship between the last character entered and any of the characters in the selection list. The default selection list is the first ten most frequently used characters ("的一不是了我人在有・"). Before any stroke is added, or after a punctuation mark such as a period mark (°), a question mark (?), an exclamation mark (!), a semicolon (;) or a comma (,) is entered, the default selection list is in a first default sequence which is made according to the frequency that each of the characters in the selection is used as the first character of a sentence or half-sentence. For purposes of the discussion herein, a half-sentence is a partial sentence subsequent to a semicolon or a comma. For example, a first default sequence of the default selection list might be "我・一不人在有是的了". In operation, the default sequence of the default selection list varies depending on the resources and the method of statistics used.

The default selection list may have a second default sequence which is specifically for the situation where no meaningful contextual relationship between the last character entered and any of the ten most frequently used characters can be established.

Therefore, the default selection list may have three states: (1) the default selection list in a first default sequence which is displayed when no stroke is entered or after a punctuation mark such as a period mark, a question mark, an exclamation mark, a semicolon, or a comma is entered; (2) the default selection list in a second default sequence which is displayed when a meaningful contextual relationship cannot be established between the last character entered and any of the ten most frequently used characters; and (3) the default selection list in a sequence determined according to the contextual relationship between the last character entered and any of the ten most frequently used characters.

Alternatively, the default selection list in its first default sequence may be substituted with a different default selection list which includes ten characters that are most frequently used as the first character of a sentence or a half-sentence according to statistics.

The purpose of the default selection list is to provide the user with the most probable options even before the user adds any stroke. If the desired character is in the selection list, the user just selects it and enters it into the message display area.

The purpose of the default sequence of the default selection list is to provide the user with the most probable character as his first choice as a character to start a sentence or a half-sentence. If the user's desired character happens to be the first choice, because in the default status the cursor always covers the first choice (which means that the first choice is already selected), the user just needs to make a button pressing or a joystick motion to enter the first choice into the message display area.

Figure 9:
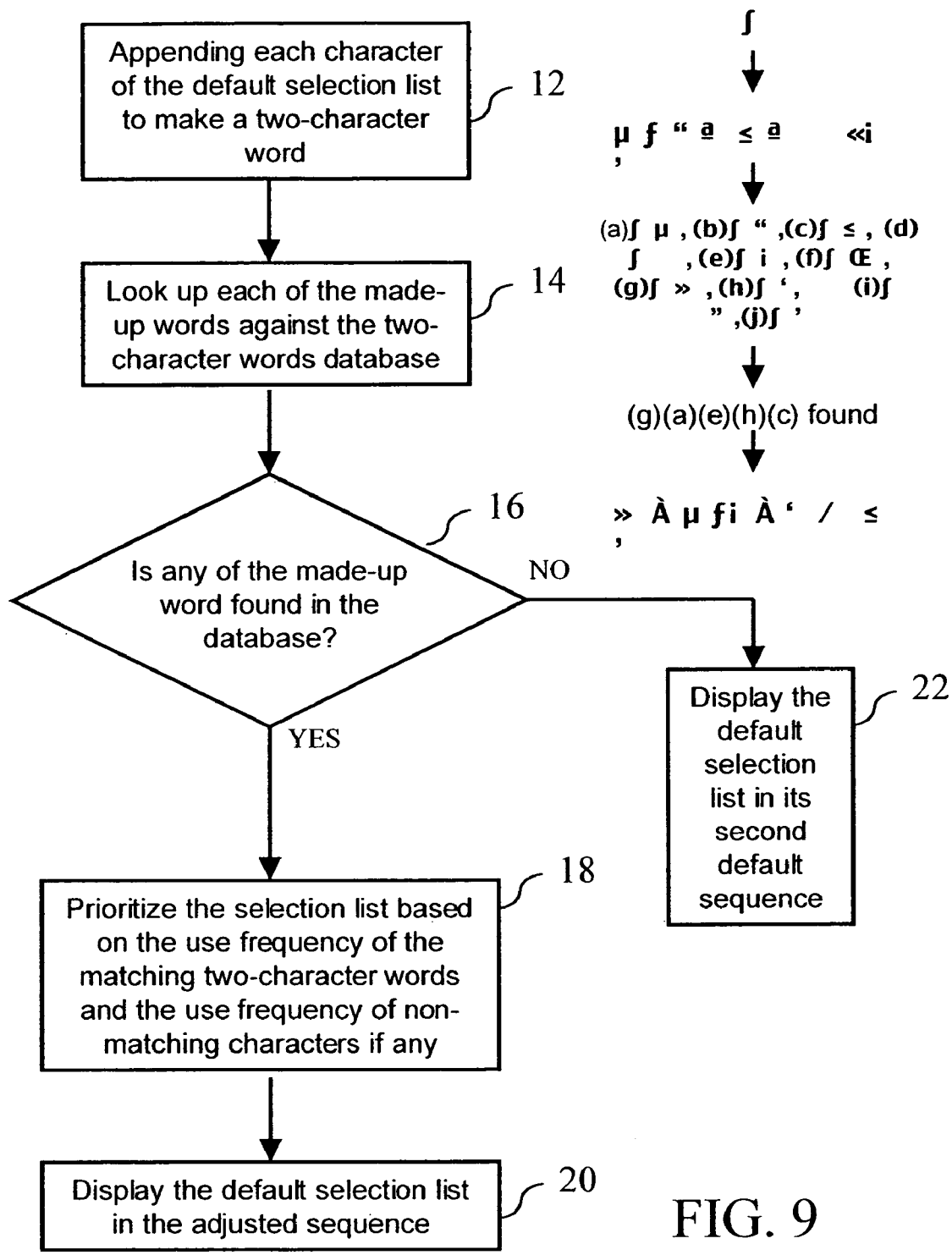
FIG. 9 is a flow diagram illustrating a process for prioritizing the default selection list, e.g. the first ten most frequently used Chinese characters.

In a given version of the Chinese vocabulary modules 128, the default selection list and its first two default sequences are not changed. It is directly displayed by the Chinese input application 127 in a proper situation without doing additional calculations. When a desired character is entered, however, the default selection list is displayed in a dynamically created sequence based on the contextual relationship between the last character entered and the characters in the default selection list. FIG. 9 is a flow diagram illustrating a process for prioritizing the default selection list according to the contextual relationships. The process includes the following steps:

Step 12: Immediately after a desired character is entered, make ten two-character words by appending each of the characters in the default selection list to the last character entered. For example, assuming the last character entered is "好", the ten made-up words are: (a)好的, (b)好一, (c)好不, (d)好是(e)好了, (f)好我 (g)好人(h), 好在, (i)好有(j)好・. Among these ten words, only (a)(c)(e)(g)(h) are meaningful, and (g)(a)(e)(h) are more frequently used than (c).

Step 14: Look up each of the made-up words against the multi-character words/phrases database.

Step 16: Check whether any word is found in the database. In this example, only (a)(c)(e)(g)(h) are meaningful words. They could be found if the database is resourceful enough.

Step 22: If none of the ten made-up words is found in the database, display the default selection list in its second default sequence.

Step 18: If any of the ten made-up words is found in the database, prioritize the default selection list according to use frequency. In particular, if all ten made-up words are found in the database, prioritize the default selection list based on the use frequency of these ten words. If only some of the made-up words are found in the database, the character whose corresponding made-up word has the highest use frequency is placed in the first choice place. The subsequent characters are placed in order according to the use frequency, from high to low, of their corresponding made-up words. Subsequent to these matching characters are the non-matching characters whose made-up words are not found in the database. These non-matching characters are also placed in order based on their use frequency, from high to low. In this example illustrated above, assuming only (a)(c)(e)(g)(h) are found in the database and assuming their use frequencies are in an order of (g)(a)(e)(h)(c), from high to low, according to statistics, the prioritized default selection list would be "人的了在不一是我有・" instead of the second default sequence "的一不是了我人在有・".

Step 20: Display the prioritized default selection list in the selection list display area. If the first choice is the user's desired character, the user just enters it without need to make a selection motion because the first choice is the default selection.

Figure 10:
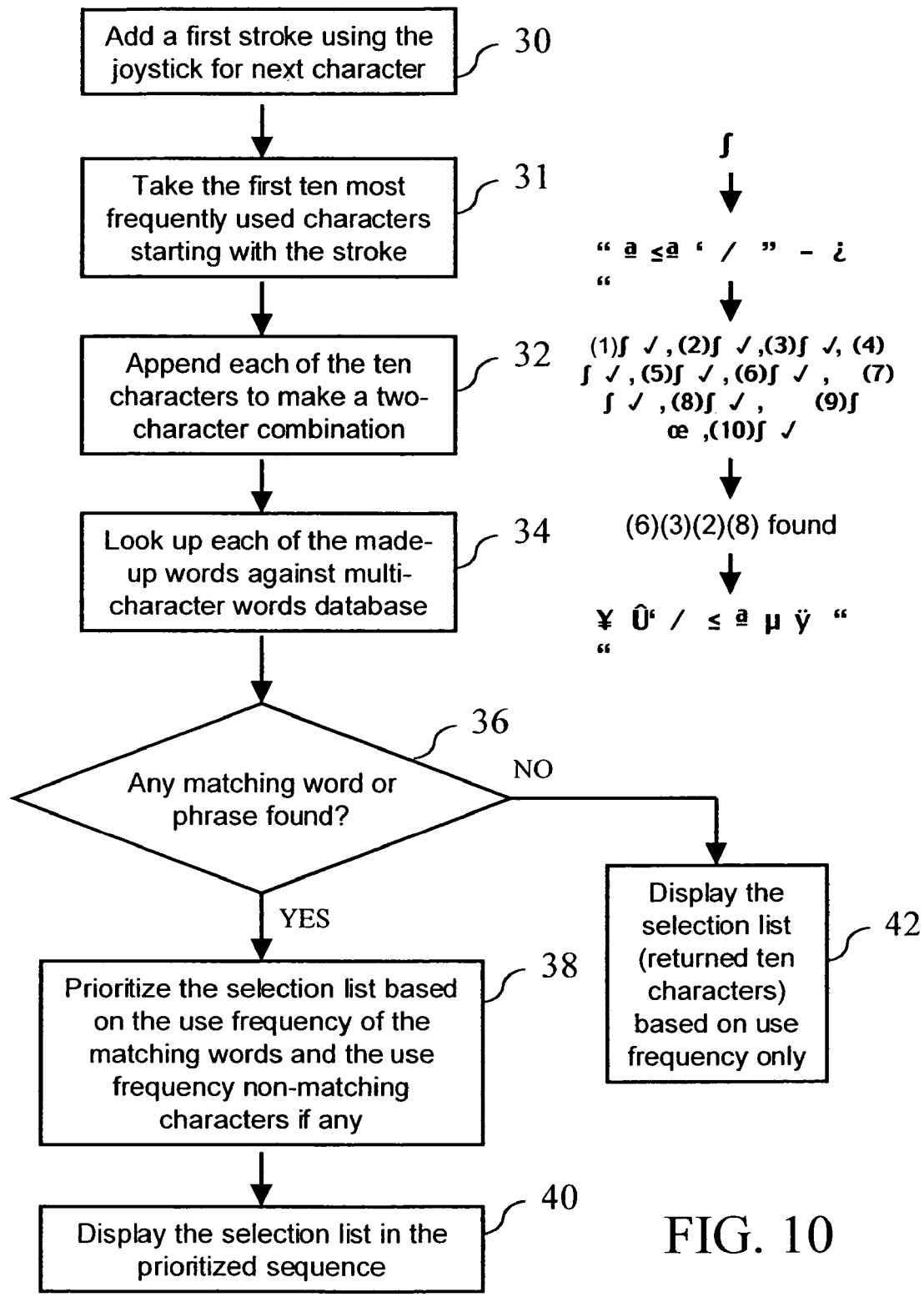
FIG. 10 is a flow diagram illustrating a process for prioritizing a dynamically created selection list based on the lasted entered character and a stroke added.

After the first desired character is entered, if the second desired character is not in the default selection list, the user needs to make a joystick motion to add a stroke. When the first stroke is added, the system looks up the database to get the groups of words whose first stroke is the added first stroke, then display the sfirst-stroke-based first ten most frequently used characters in the selection list area. The second desired character may be or may be not in the selection list which is prioritized based on the use frequency of the ten characters. To serve an ordinary user best, the selection list can also be prioritized based both on the contextual relationship and the use frequency as the scheme for prioritizing the default selection list described above. FIG. 10 is a flow diagram illustrating a process for prioritizing the sequence of a dynamically created selection list based on a stroke added. The process includes the following steps:

Step 30: Immediately after a desired character is entered, if the next desired character is not in the default selection list, add a first stroke for the next desired character.

Step 31: Index the group of characters that start with the added stroke and take the first most frequently used characters as candidate selection list.

Step 32: Append each of the ten characters in the candidate selection list to the last character entered to make ten made-up words of combinations. For example, assuming the last character entered is 好, and the candidate selection list based on the first stroke (一) is "一不在 有来大 到地下要", the made-up words or combinations are: (1)好一, (2)好不, (3)好在, (4)好有, (5)好来, (6)好大, (7)好到, (8)好地(9)好下, (10)好要. Among these ten made-up words, only (6)(3)(2)(8) are meaningful, and (6) are more frequently used than (3)(2)(8).

Step 34: Look up each of the made-up words against the multi-character words/phrases database.

Step 36: Check whether there is any word or phrase in the database whose first two characters matches each of the ten made-up words or combinations. In this example, only (6)(3)(2)(8) are meaningful words. They could be found if the database is resourceful enough.

Step 42: If no matching word or phrase is found in the database, the selection list is displayed in a sequence purely based on the use frequency of each of the ten characters.

Step 38: If any multi-character word or phrase whose first two characters matches any of the ten made-up words, prioritize the candidate selection list according to contextual association value and use frequency. The more matching words or phrases a made-up word or combination has in the database, the higher the contextual association value of the made-up word's second character is. In particular, if all ten made-up words have matching words or phrases in the database, prioritize the candidate selection list based on the use frequency of the matching words or phrases. If only some of the made-up words have matching words or phrases in the database, the character whose corresponding matching word or phrase has the highest use frequency is placed in the first choice place. The subsequent matching characters are placed in order according to the use frequency, from high to low, of their corresponding matching words or phrases. Subsequent to these matching characters are the non-matching characters whose made-up words do not have any matching word or phrase in the database. These non-matching characters are also placed in order based on their use frequency, from high to low. In our example illustrated above, assuming only (6)(3)(2)(8) are found in the database and assuming their use frequencies are in an order of (6)(3)(2)(8), from high to low, according to statistics, the prioritized default selection list would be "大在不地一有来到下要" instead of the default sequence "一不在 有来大到地下要".

Step 40: Display the prioritized selection list in the selection list display area. If the first choice is the user's next desired character, the user just enters it without need to make a selection motion because the first choice is the default selection.

The method of prioritizing the dynamically created candidate selection list according to the last character entered and the first stroke added is also applicable in other situations where the added stroke is the second, third, or fourth strokes required for the next desired character. As illustrated in FIG. 8, the more strokes added, the lower the level of the child node containing the desired character. Note that the system according to the invention is not stroke number based. Rather, it is use frequency based. A desired character which requires many strokes may appear in the selection list when no stroke is added or when the first stroke or the second stroke is added. For example, the character "要" consists of nine strokes, but it is available when the first "一" stroke is added; the character "我", one of the first ten most frequently used characters, consists of seven strokes, but it is available even when on stroke is added.

The scheme for prioritizing the selection list based on use frequency does not necessarily satisfy specific users, such as novelists or journalists who always attempt to write creatively using unusual words, but it can best serve the general public because the statistical data for the use frequency is collected from a well-sampled group representative of the general public. For this reason, the Chinese vocabulary modules 128 may have different versions to reflect different needs of different professions or speakers of different dialects. For example, in a medical professional version, the system should be more likely to predict medical words for medical professionals. Similarly, in a Taiwanese version, the system should be more likely to predict the characters frequently used by Taiwanese.

The Chinese input system may further include: the capabilities to match Latin letters, Roman letters, Arabic numerals, punctuation symbols, and emoticons, with predefined sequences of joystick motions; the capability for the user to define his own stroke category or other symbols; optional training session with known characters; optional prompting of the user to clarify between ambiguous stroke interpretations; means to add explicit strokes and/or remedy a stroke misinterpretation; optional indication of level of confidence of stroke interpretations, e.g. color-coding each "ink trail" or a smiley-face that frowns when it is uncertain; as well as ability to delete the last stroke(s) in reverse order.

Figure 11:
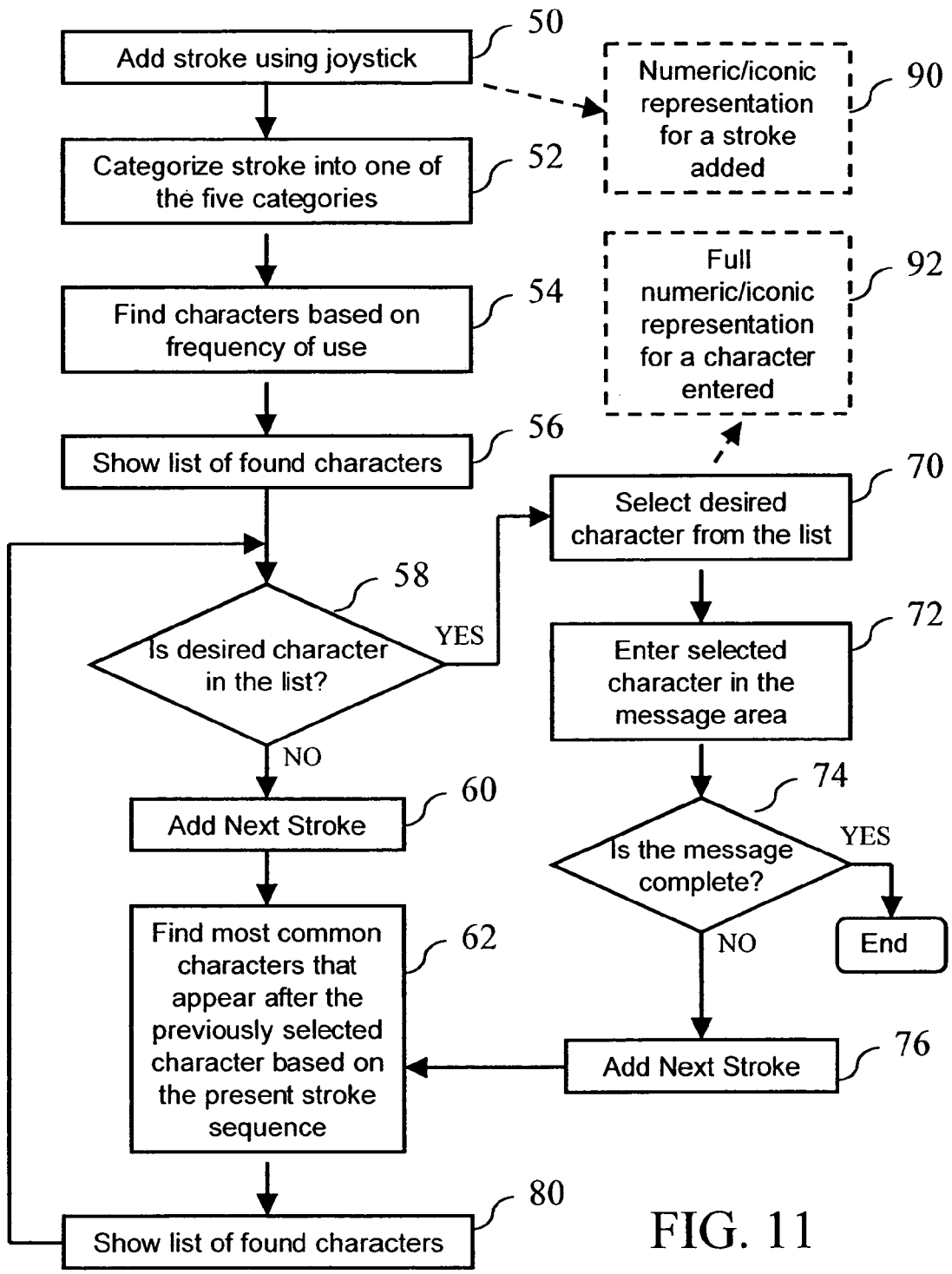
FIG. 11 is a flow diagram illustrating a method for inputting Chinese characters using a joystick according to the preferred embodiment of the invention.

FIG. 11 is a flow diagram illustrating a method for inputting Chinese characters in a predictive manner according to the preferred embodiment of the invention. The method includes the following steps:

Step 50: Add a stroke by a predefined joystick motion as illustrated in the table of FIG. 7. In various deployments, this is done by sending a signal representative of a stroke to the processor.

Step 52: Categorize the added stroke into one of the five categories. This is actually a step of indexing a first level child node in the structure tree of FIG. 8 which matches the first added stroke. For example, when the first stroke "3" is identified, the whole "group 3" of characters that start with the stroke "3" become candidates for selection.

Step 54: Find characters under the category based on frequency of character use. This can be done by ranking the characters according to a value which is associated with each character and representative of the frequency of use of the character.

Step 56: Display a list of found characters in the word selection area 105 of FIG. 3 (or the word selection area 115 of FIG. 4). The selection list of characters is displayed in a sequence. Preferably, the sequence is based on the use frequency of a found Chinese character and the contextual relation to the prior character entered as illustrated in FIG. 9 and FIG. 10.

Step 58: Check whether the desired character in the selection list.

Step 60: If the desired character is not in the selection list, add next stroke by another joystick motion. For example, as illustrated in FIG. 8, a second stroke "1" is added.

Step 70: If the desired character is in the list, select it by a joystick motion representing a "select" function such as moving from position 0 to position 12 in FIG. 6 or by pressing a button adapted to the joystick. Because the default status of a selection means such as a color cursor is preferably on the first character of the selection list, if the desired word appears in the first choice place, the selection action is unnecessary and the user can directly enter the desired character into the message display area by an "ENTER" action (see Step 72).

Step 72: Put the selected character in the message display area 105 in FIG. 3 (or the message display area 115 in FIG. 4). This is done by a button pressing action such as pressing the "ENTER" button or by a predefined joystick motion.

Step 74: Check whether the message is complete.

Step 76: Add next stroke if the message is not complete.

Step 62 (continued from Step 60 or Step 76): Find most common characters that appear after a previously selected character based on a present stroke order. This also happens before the first stroke, i.e. before Step 50. The details of this step have been described in the above paragraphs in connection with FIG. 9 and FIG. 10.

Step 80: Display the selection list, i.e. the ten found characters, and the process continues on Step 58.

Optionally, the device 101 in FIG. 3 or 110 in FIG. 4 may have a function to dynamically display the interface interpretation, either numeric or iconic, of the stroke or strokes entered by the user. In that case, the method described above may further comprise the steps of:

Step 90: Display a numeric/iconic representation for a stroke that is added via a joystick motion; and Step 92: Display a full stroke numeric/iconic representation for a character that is entered.

As an alternative, Step 54 may be replaced by the step of finding characters that commonly start with one or more recognized stroke patterns.

The default selection list may be displayed before step 50 or step 76 as previously described in the paragraphs in connection with FIG. 9.

One of the major advantages of the Chinese input system according to the invention is the great reduction of ambiguities arising in the subtle distinction between certain subtypes of the stroke categories. To reduce ambiguities, we have made further definitions on the subtypes corresponding to the joystick motions. For example, a horizontal motion with a slight upward motion is stroke 1; a horizontal motion with a slight downward motion is stroke 5; an approximate horizontal motion from position 0 to a position between 2:30 and 3:30 is stroke 1; an approximate vertical motion from position 0 to a position between 11:00 and 1:00 is a select operation, and etc. Often the difference between two joystick motions is too subtle for a processor to differentiate. However, with the user getting more familiar and intuitive to the joystick, the input will be more effective and more efficient.

The operation process illustrated in FIG. 11 is further illustrated in the following paragraphs in conjunction with a series of schematic, pictorial diagrams based on the embodiment of FIG. 4.

Figure 12:
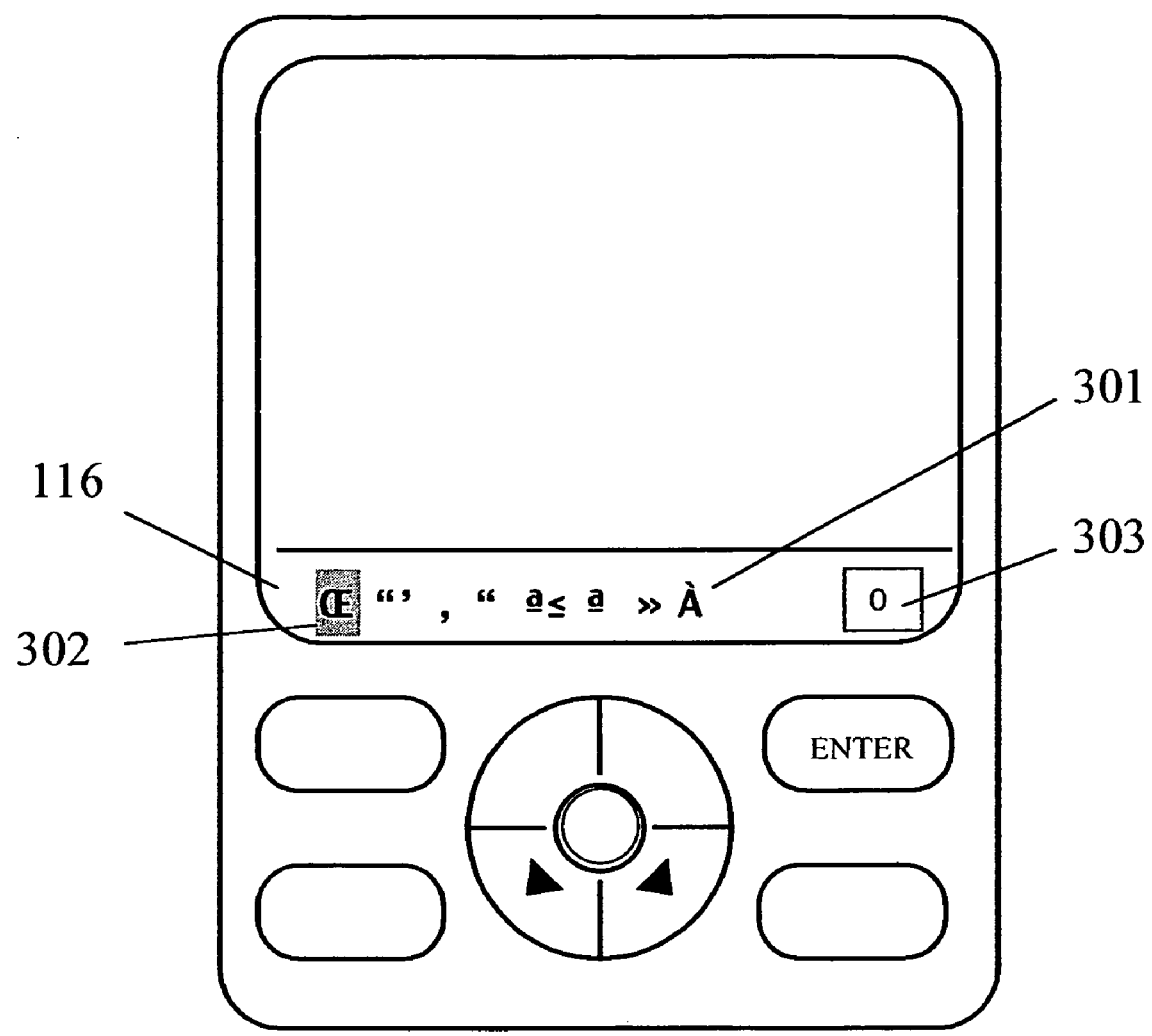
FIG. 12 is a pictorial diagram illustrating an overview of the Chinese input interface before any stroke is added.

FIG. 12 illustrates an overview of the Chinese input interface before any stroke is added. In the character selection area 116, a default selection list in its first default sequence (我·一不人在有是的了) 301 is displayed. The first default sequence of the default selection list is the sequence of the first ten most frequently used Chinese characters in ordinary usage according to statistics prioritized by the frequency of each of the characters used as the first character of a sentence or a half-sentence. If the user's first desired character happens to be in the default selection list, he just moves the cursor 302, which is a transparent or semi-transparent bitmap, over the desired character to select it, and then makes an ENTER operation. If the first desired character is the first character of the default selection list, the user just enters the character by an ENTER operation without need to make a selection action.

In one deployment, the user moves the cursor for character selection by pressing a "<>" button, and makes an ENTER operation by a joystick motion such as moving from position 0 to position 12.

In another deployment, the user moves the cursor for character selection by moving the joystick, for example, from position 0 to position 12, or from position 10 to position, and makes an ENTER operation by clicking a button.

Yet in another deployment, the user uses the joystick to do both the selection and the ENTER operations.

Yet in another deployment, the selected character automatically entered the message display area right after a short period of time, e.g. 0.5 second, the character was selected, i.e. the cursor moves over on it.

If the desired character is not in the default selection list, the user adds a stroke by moving the joystick. Optionally, a numeric representation for a stroke added is displayed in the stroke number area 303. In the step illustrated in FIG. 12, because no stroke has been added, the area shows a zero. Alternatively, an iconic representation for a stroke added can be displayed.

Figure 13:
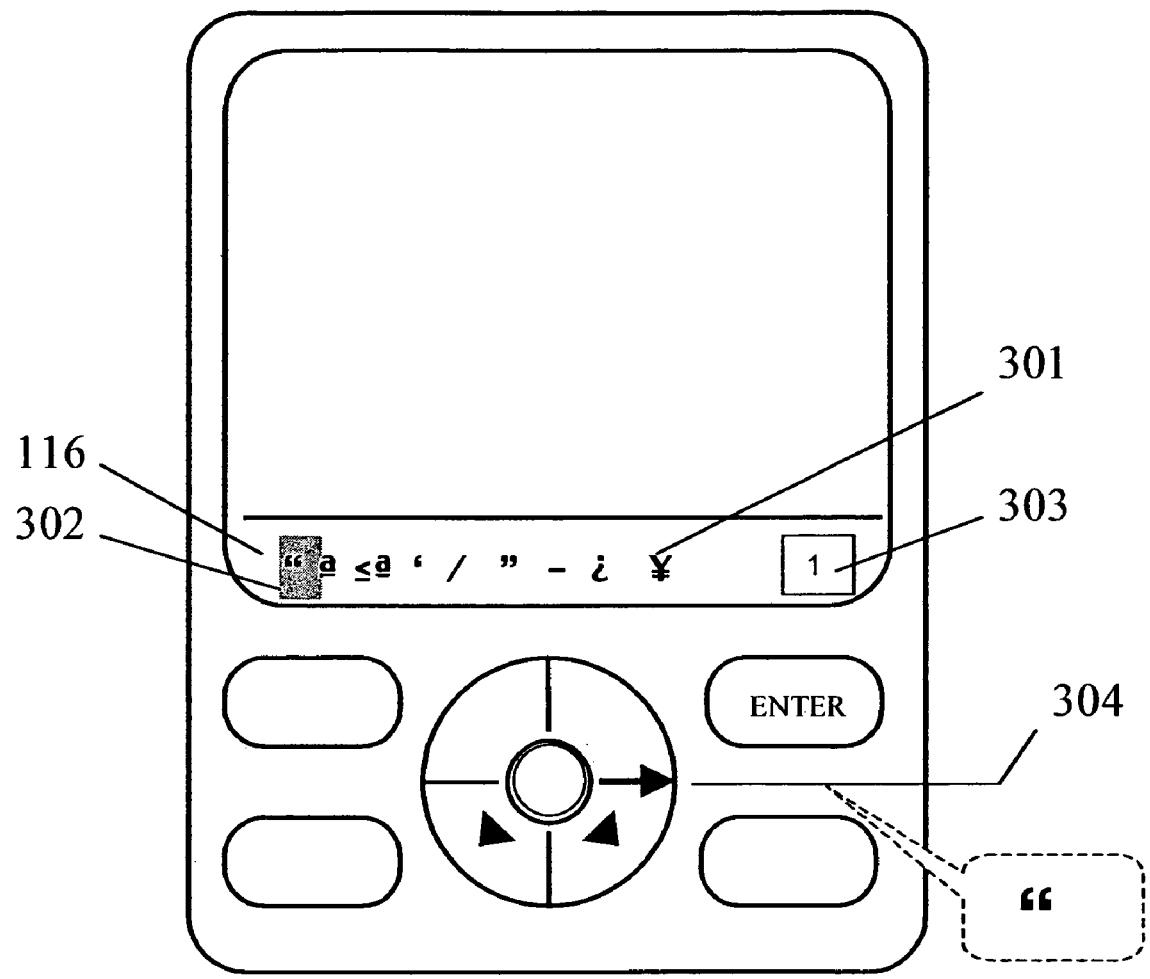
FIG. 13 is a pictorial diagram illustrating an overview of the Chinese input interface where a first single horizontal stroke is added.

Assuming the user adds a first single horizontal stroke, as illustrated in FIG. 13, by a joystick motion 304, i.e. from position 0 to position 3. The stroke category is determined to be "1," which is listed in the stroke number area 303. The system looks up the database and displays a first selection list containing the first most frequently used characters that start with the first added stroke (一不在有来大到地下要) in the selection list display area 116.

Figure 14:
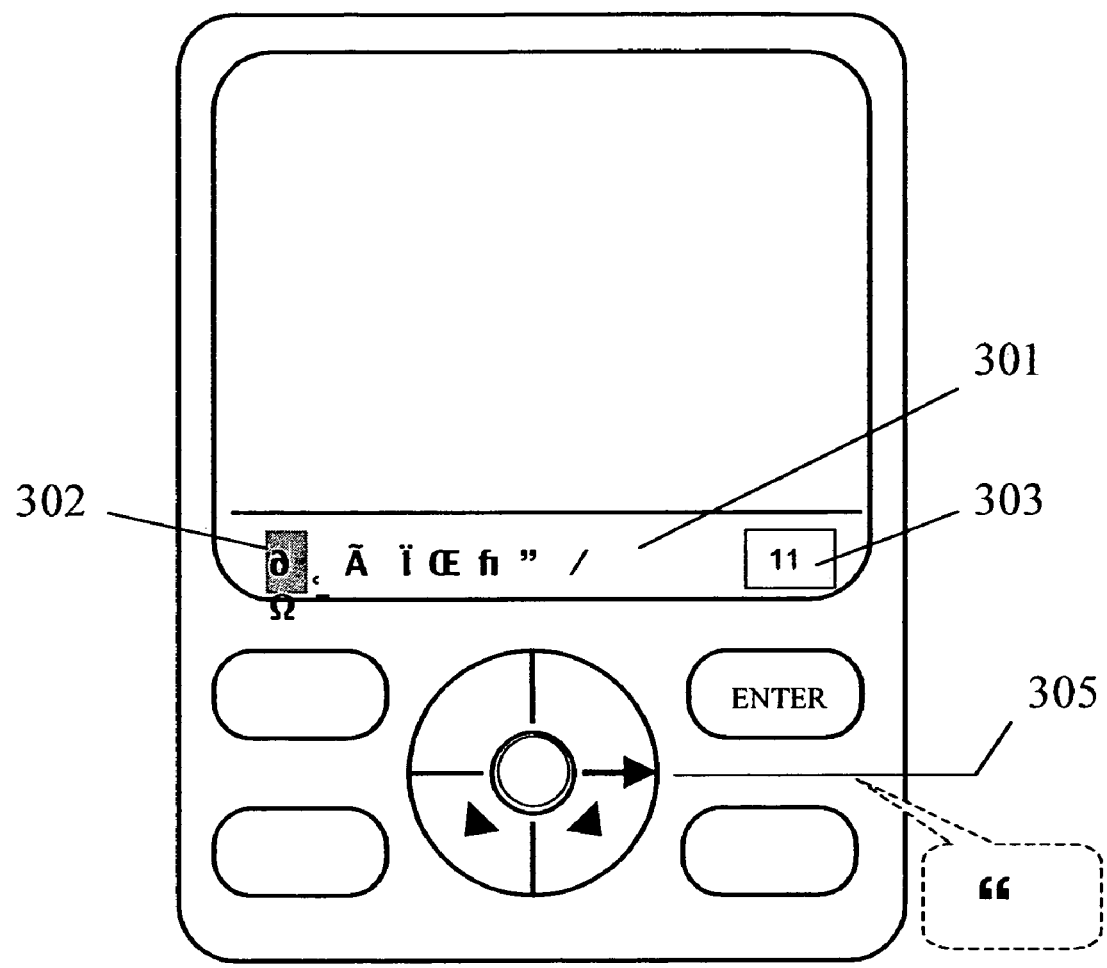
FIG. 14 is a pictorial diagram illustrating an overview of the Chinese input interface where a second horizontal stroke is added.

Assuming the first desired character is not in the first selection list in FIG. 13, the user adds a second horizontal stroke as illustrated in FIG. 14. After a second horizontal stroke is entered by the joystick motion 305, the system looks up the database and displays a second selection list containing the first ten most frequently used characters that start with the first added stroke and then the second added stroke (二天无于·三···理). Because the user has added two first category strokes, the stroke number area 303 shows "11."

Figure 15:
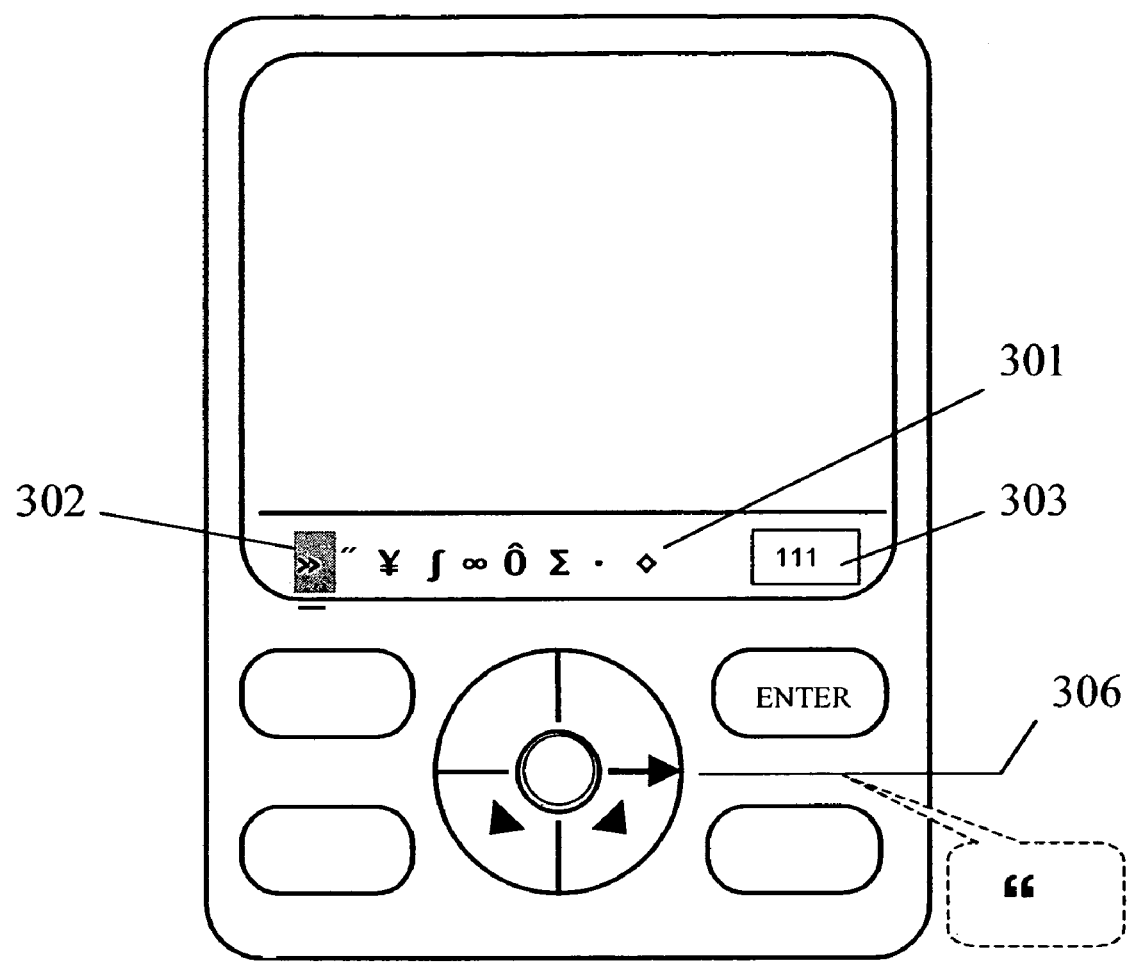
FIG. 15 is a pictorial diagram illustrating an overview of the Chinese input interface where a third horizontal stroke is added.

Assuming further that the desired character is not in the second selection list in FIG. 14, the user adds a third horizontal stroke a third horizontal joystick motion of the joystick. After the third horizontal stroke is added, as illustrated in FIG. 15, the system looks up the database and display a third selection list containing the first most frequently used characters that start with the first added stroke and then the second added stroke and then the third added stroke (三春帮丰奏奉秦慧邦·). In the step of FIG. 15, because the user has added three horizontal strokes, the stroke number area 303 shows "111."

Figure 16:
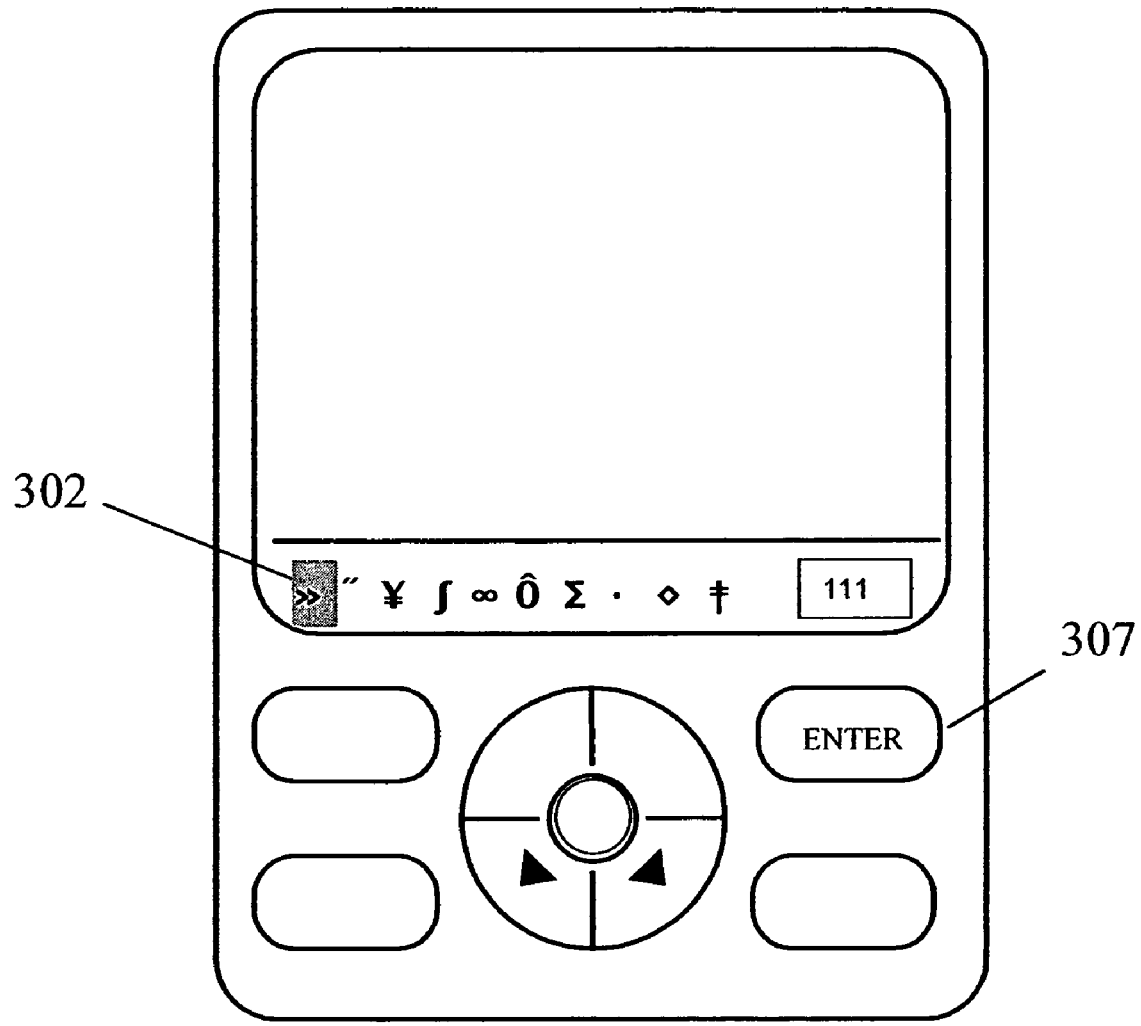
FIG. 16 is a pictorial diagram illustrating an overview of the Chinese input interface where a desired character appears to be the first character in the displayed selection list.

Assuming the user wants to enter the first character in the third selection list, because the first choice is selected by default, i.e. the first character in the selection list s always covered by the cursor 301, the user may simply press the ENTER button as illustrated in FIG. 16. Alternatively, the ENTER operation can be done by a defined joystick motion.

Figure 17:
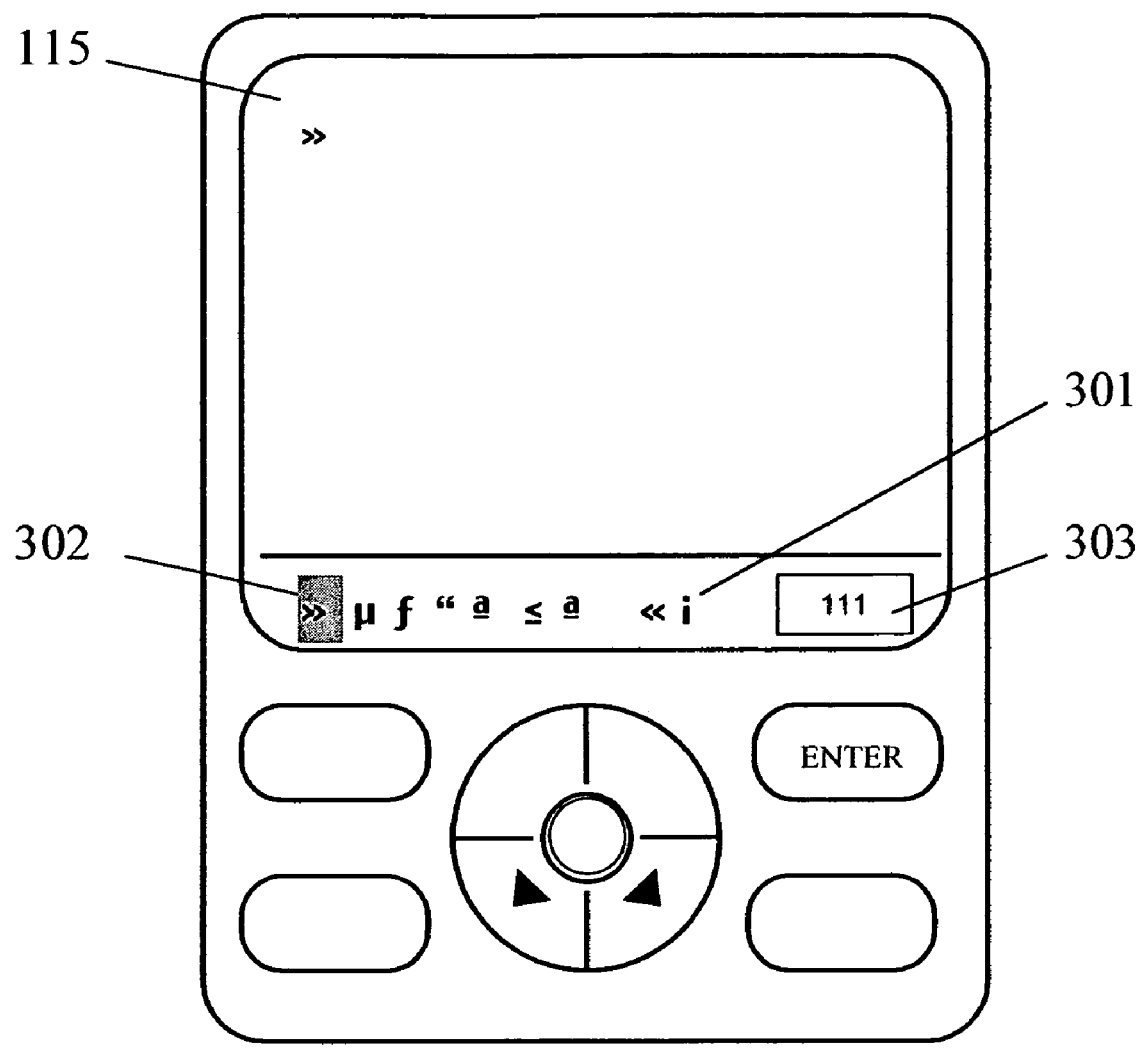
FIG. 17 is a pictorial diagram illustrating an overview of the Chinese input interface where the first character in the selection list is entered and the default selection list is displayed.

FIG. 17 illustrates the Chinese input interface when the first character (三) in the third selection list is added to the message display area 115. When the desired character is added, they system makes a number of calculations as illustrated in FIG. 9 and displays the default selection list based on the contextual relationship between the last character entered (三) and any of the ten characters in the default selection list (的一不是了我人在有·). Among the first ten most frequently used characters (的一不是了我人在有·), the character "人" is the most possible character that can make a meaningful word with the last character entered (三). If the first character "人" in the default selection list happens to be the user's next desired character, the user can enter it by giving an ENTER command without need to make a selection action because the first character in the selection list is selected by default. Before the user adds another stroke, the stroke number area 303 shows the stroke numbers (111) required for the last character entered (三).

Figure 18:
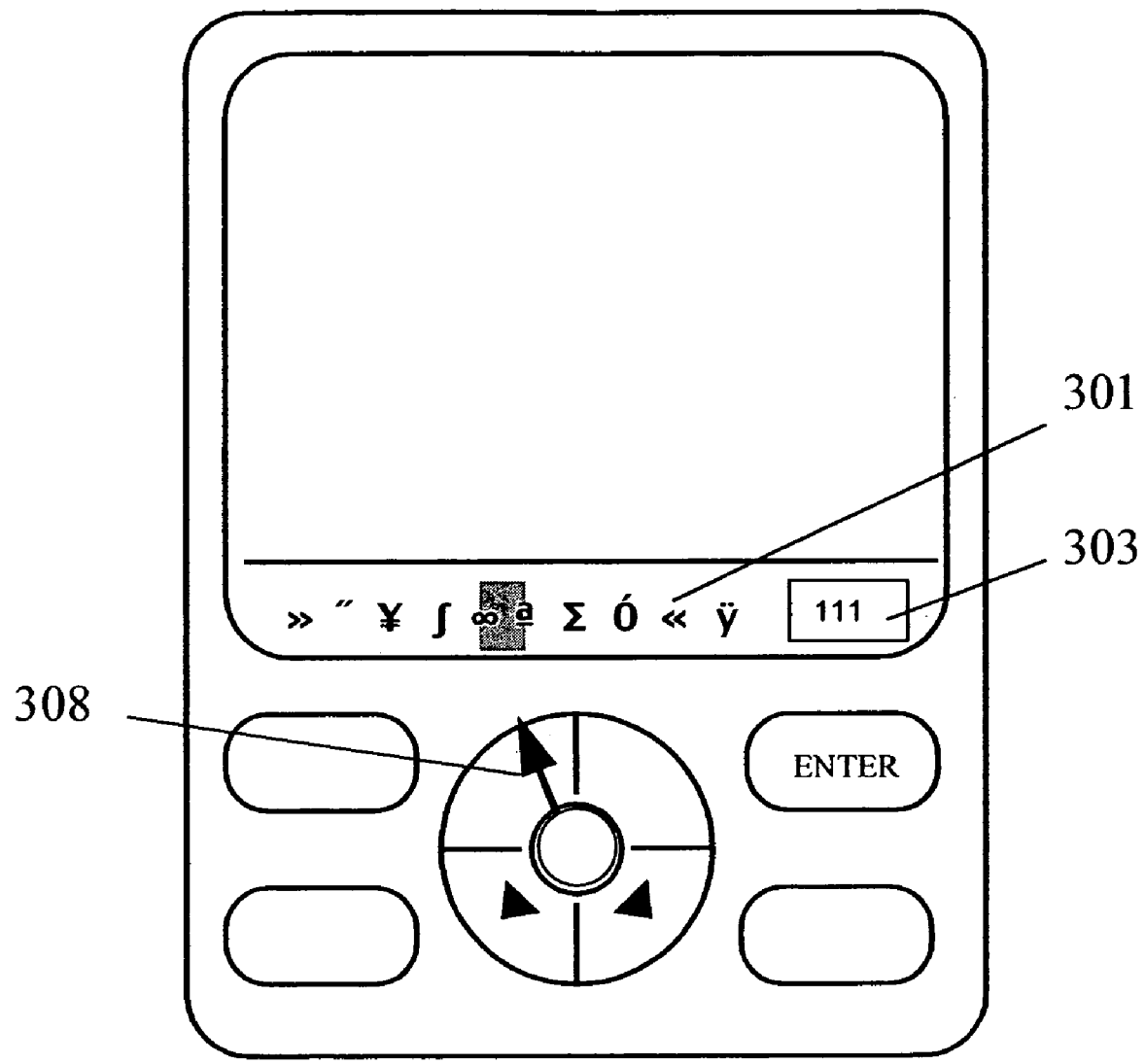
FIG. 18 is a pictorial diagram illustrating an overview of the Chinese input interface where the desired character is not the first character in the selection list and the user moves the joystick to select the desired character.

Now assuming the user's first desired character is not the first character in the selection list 301 shown in FIG. 15, and assuming the first desired character is the eighth character (慧), the user may, as illustrated in FIG. 18, first move the cursor 302 over the character by a joystick motion such as the motion 308, then enter the character by giving an ENTER command such as a button pressing or a defined joystick motion. The strength of this system is its predictive abilities. If a user desires a very complex, but somewhat common, character pointed to in the above illustration, the user needs not complete the stroke for that character. As soon as it is displayed in the selection list 301, it can be selected and entered by one or two joystick motions.

Note that using the joystick, the complex character (慧) with fifteen strokes can be added into the message display area 115 with only four simple movements, i.e. three horizontal strokes 111, one for moving the cursor to select the desired character if the desired character is not the first character in the selection list, and one button pressing, or a defined joystick motion, for entering the selected character. Additionally, the entire stroke order for the character entered is displayed in the stroke number area 303. If the user was used to an alternate stroke order for the character, he can learn the Government Standard stroke order used by this system.

Figure 19:
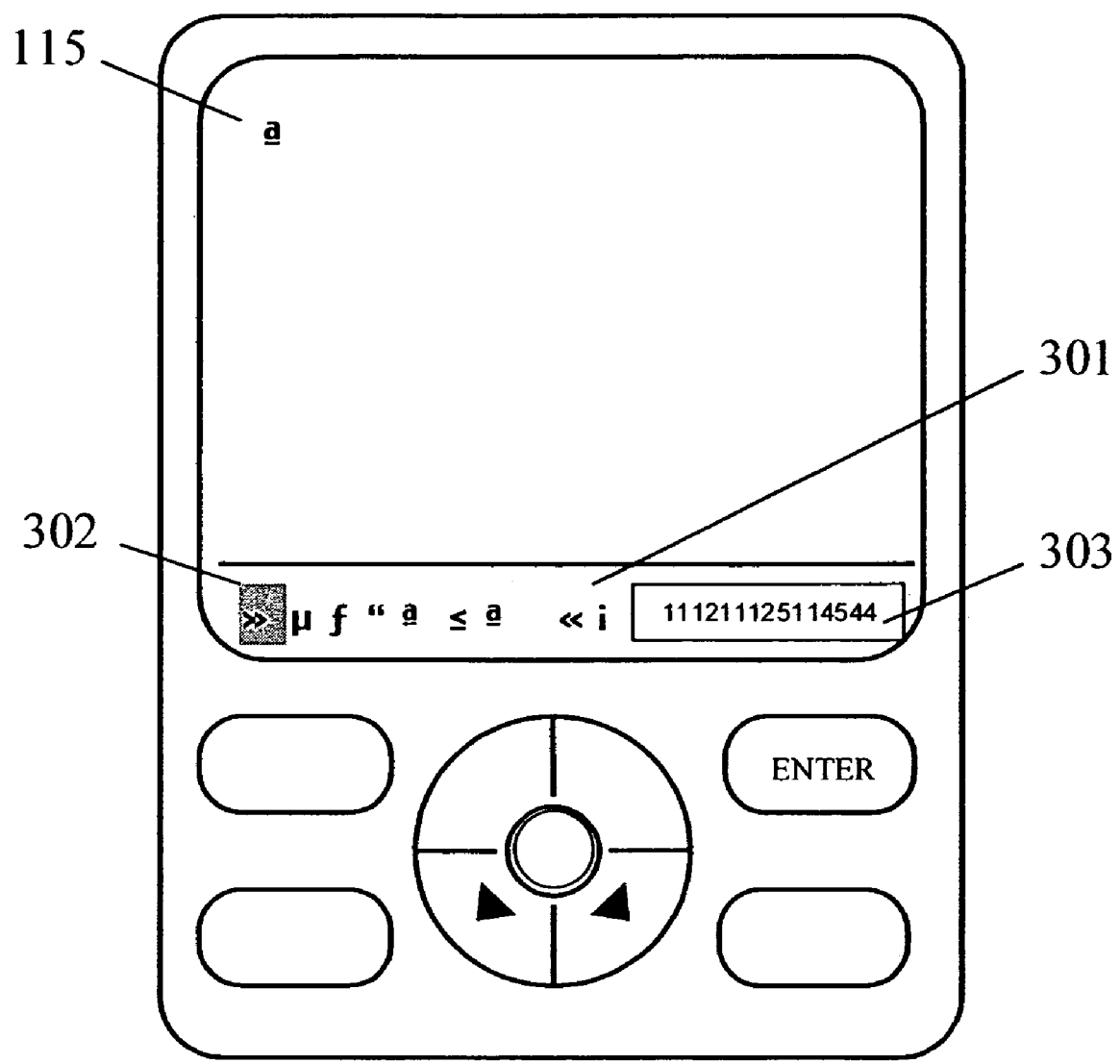
FIG. 19 is a pictorial diagram illustrating an overview of the Chinese input interface where the desired character in FIG. 15 is entered and the default selection list is displayed.

Once the desired character (慧) is selected and is added to the message display 115 area, as illustrated in FIG. 19, the system displays the default selection list (人的一不是了我在有·) which is prioritized based on the contextual relationship between the last character entered (慧) and any of the ten most frequently used characters (的一不是了我人在有·). Assuming the next desired character is "孩" which is not in the default list, the user needs to make a joystick motion corresponding to the first stroke (→) of the next desired character (孩).

Figure 20:
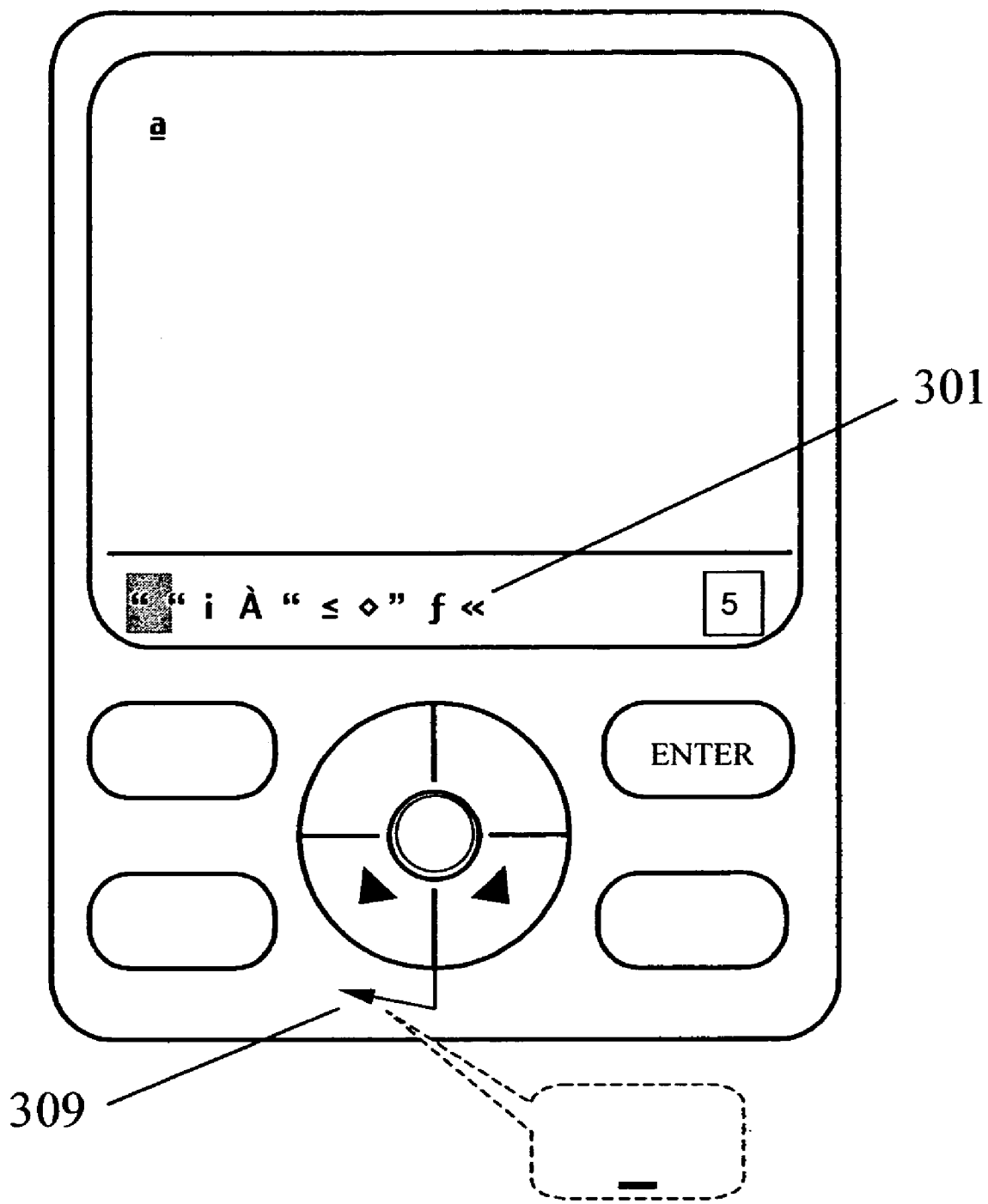
FIG. 20 is a pictorial diagram illustrating an overview of the Chinese input interface where a first stroke for the second desired character is added because after the first desired character is entered the second desired character was not in the default selection list.

When the first stroke (→) for the next desired character (孩) is added by a joystick motion 309, as illustrated in FIG. 20, the system looks up the database and displays a selection list containing the first ten most frequently used characters that start with the added stroke (→). Assuming the last character entered (慧) cannot make up a meaningful word with any of the ten characters, the selection list is prioritized purely based on the use frequency of each single character. Because the next desired character (孩) is not in the selection list 301 triggered by the joystick motion 309, the user needs to make another joystick motion corresponding to the second stroke (丨) for the character (孩).

Figure 21:
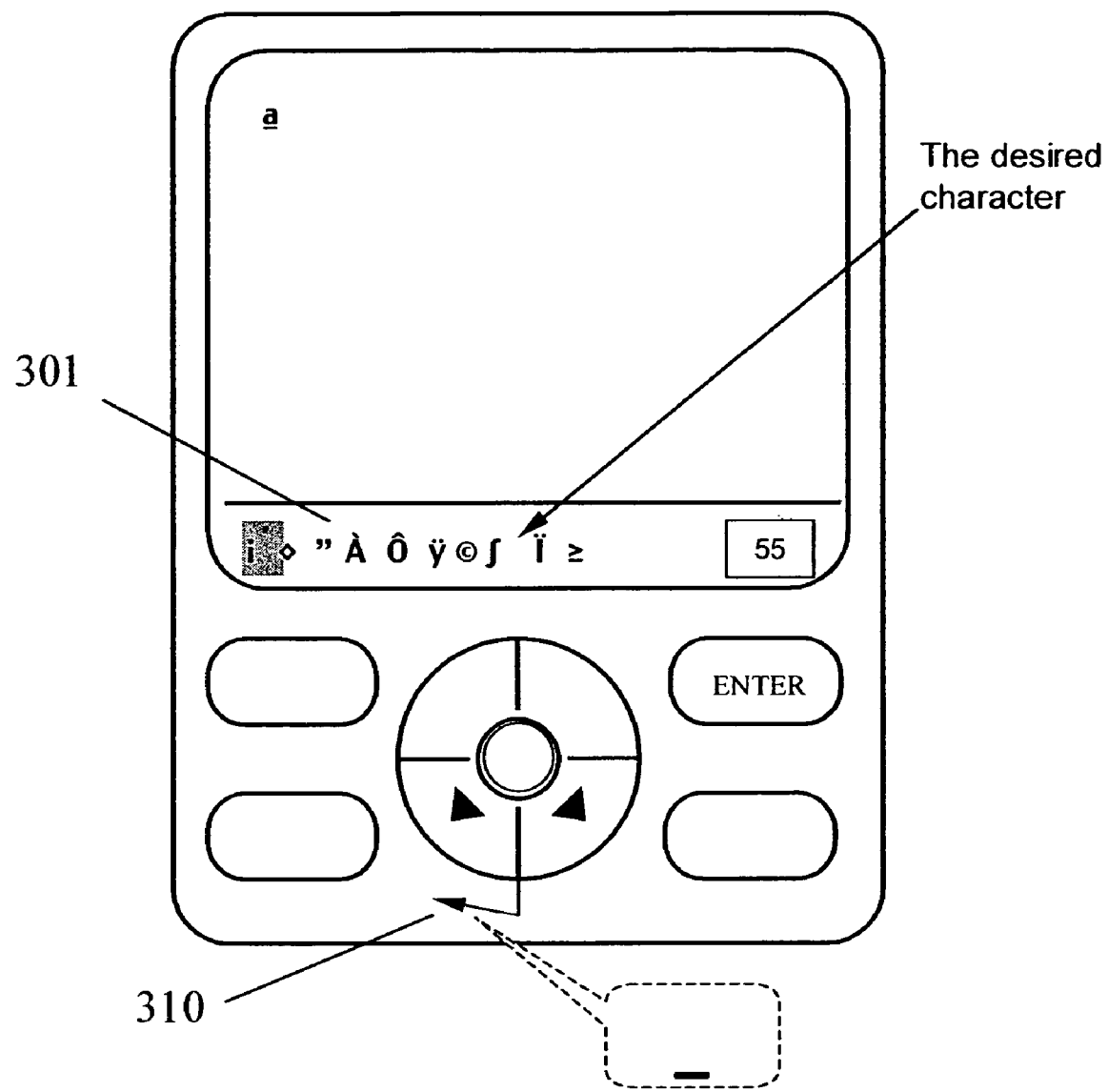
FIG. 21 is a pictorial diagram illustrating an overview of the Chinese input interface where a second stroke for the second desired character is added because the second desired character was not in the selection list corresponding to the first stroke for the second desired character.
Figure 22:
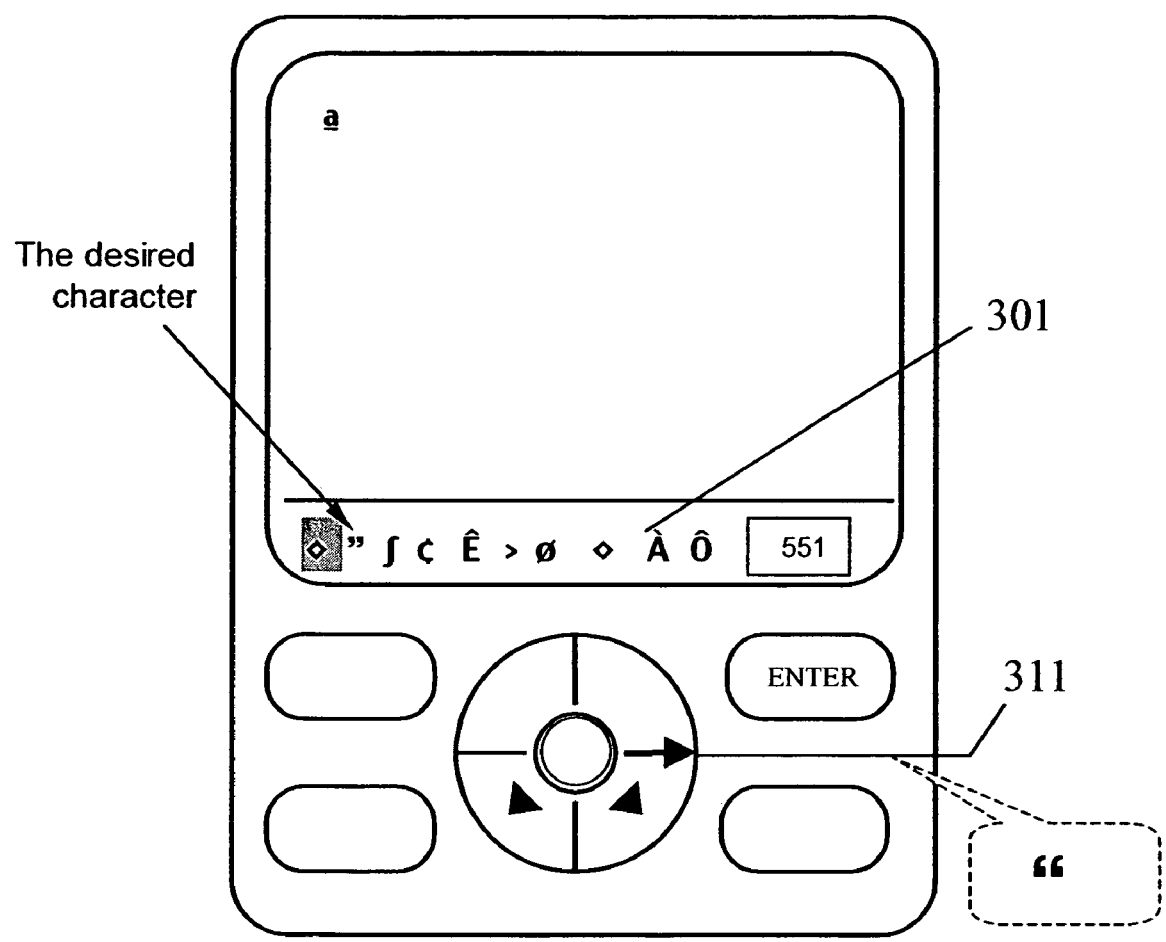
FIG. 22 is a pictorial diagram illustrating an overview of the Chinese input interface where the third stroke is added although the desired character was in the selection list corresponding to the second stroke for the second desired character.

FIG. 21 illustrates the Chinese input interface when the second stroke (丨5) is added by the joystick motion 310. The desired character (孩) appears in the selection list 301, which is the second character from the right. The user may select the character and enter it into the message display area by one or two simple motions. For example, the user first moves the cursor over the character to select it and then makes an ENTER operation to enter it into the message display area. Assuming the user wants to continue to demonstrate the disambiguation feature of the system by adding the third stroke (—1) of the character (孩), a new selection list triggered by the third stroke is displayed as shown in FIG. 22.

After the joystick motion 311 for the third stroke (—1) is added, the selection list 301 contains two characters (the first 子and the third 孑from the left) that are only slightly different from each other. In fact, these two characters have exactly the same stroke order, and choosing from the selection list is the only way to disambiguate the two characters. Note that the third character (孑) is not only less commonly used than the first one (子), but also of a slightly more complex structure.

Figure 23:
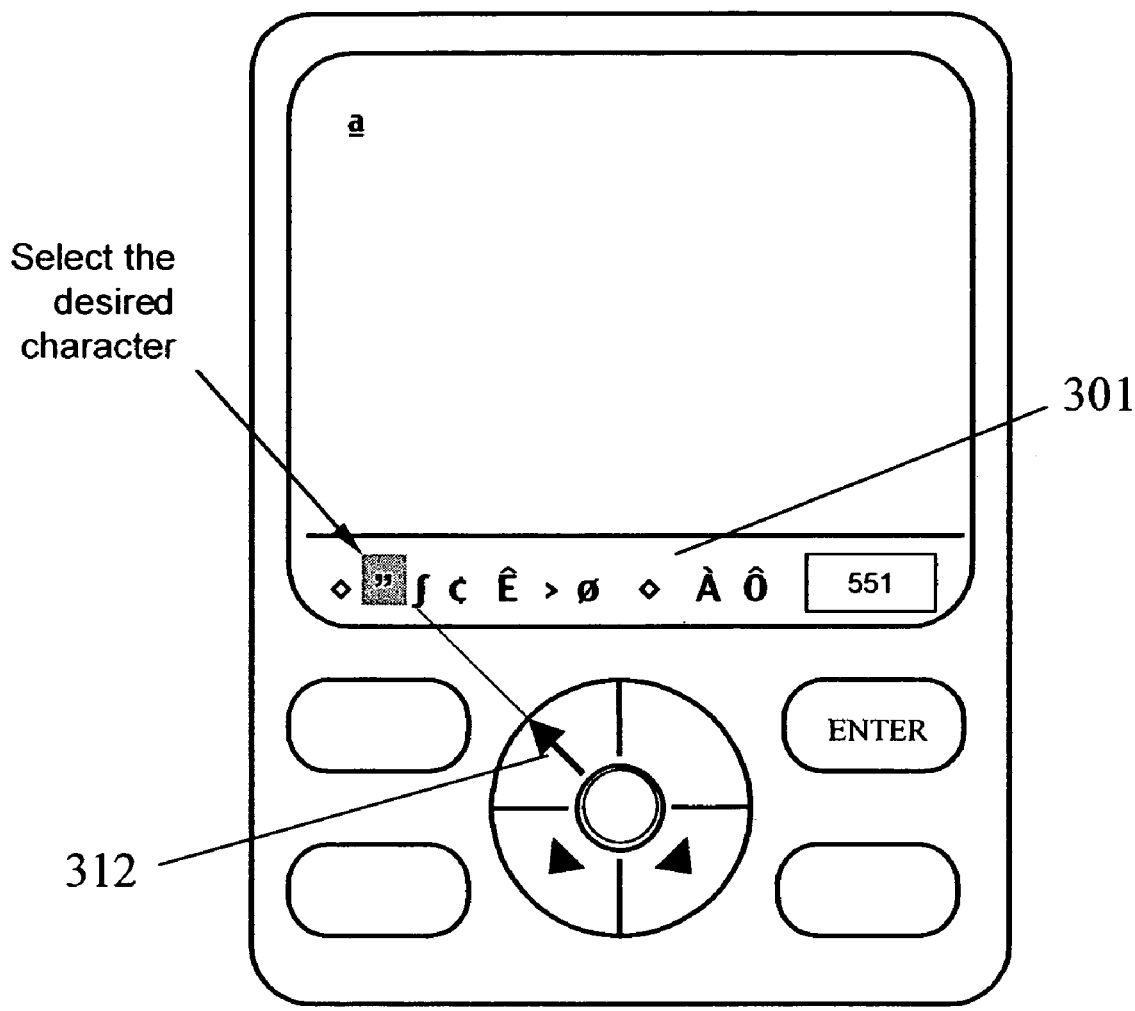
FIG. 23 is a pictorial diagram illustrating an overview of the Chinese input interface where the second desired character is selected by moving the cursor over the character.

Note that the second desired character was first visible after the second stroke (丨5) was added (see FIG. 21), and is still a likely choice in the selection list (the second from the left) after the third stroke (—1) is added. If the desired character was removed from the selection list for some reason, it is an indication that the stroke order entered by the user does not match the Government Standard stroke order used in the system. Now as illustrated in FIG. 23, the user selects the second character (孩) by making a joystick motion 312.

Figure 24:
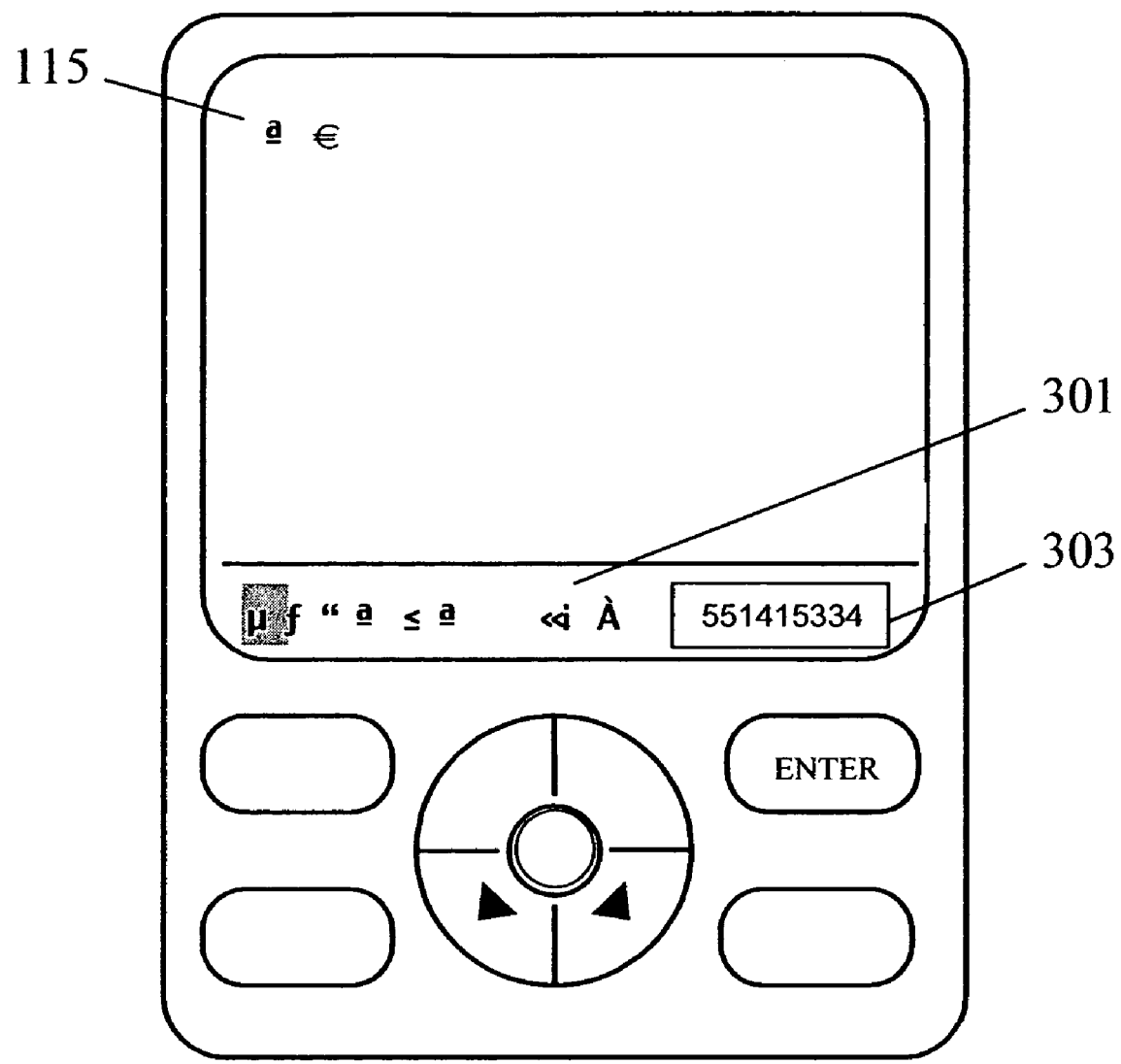
FIG. 24 is a pictorial diagram illustrating an overview of the Chinese input interface where the second desired character is entered and the default selection list is displayed.

Then, as illustrated in FIG. 24, the user enters the selected character (孩) into the message display area. The entered character (孩) is composed of nine strokes. We selected it at the third stroke motion (—丨—551), but could have selected it at the second stroke motion (See FIG. 21).

Figure 25:
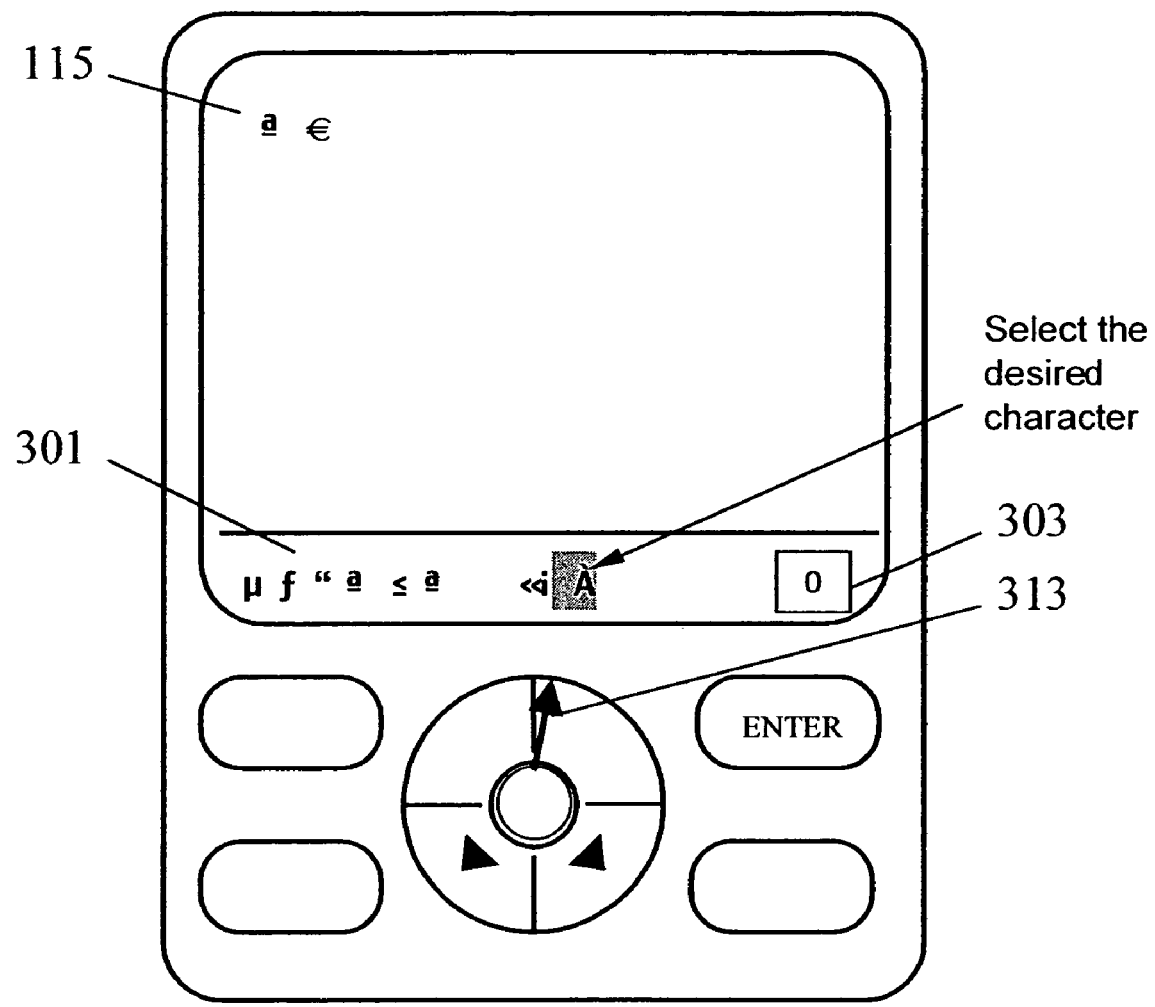
FIG. 25 is a pictorial diagram illustrating an overview of the Chinese input interface where a third desired character appears in the default selection list and the third character is selected by moving the cursor over it.

After the second desired character (孩) is entered, the selection list returns to the default status. Assuming the third desired character is "这", which appears in the default selection list (the first from the right) as illustrated in FIG. 25, there is no need to make a stroke motion because the ten most frequently used characters are displayed even before the user touches the joystick. The user just selects the character by moving the cursor over the desired character by the joystick motion 313 and enters the character into the message display area 115 by an ENTER operation.

Figure 26:
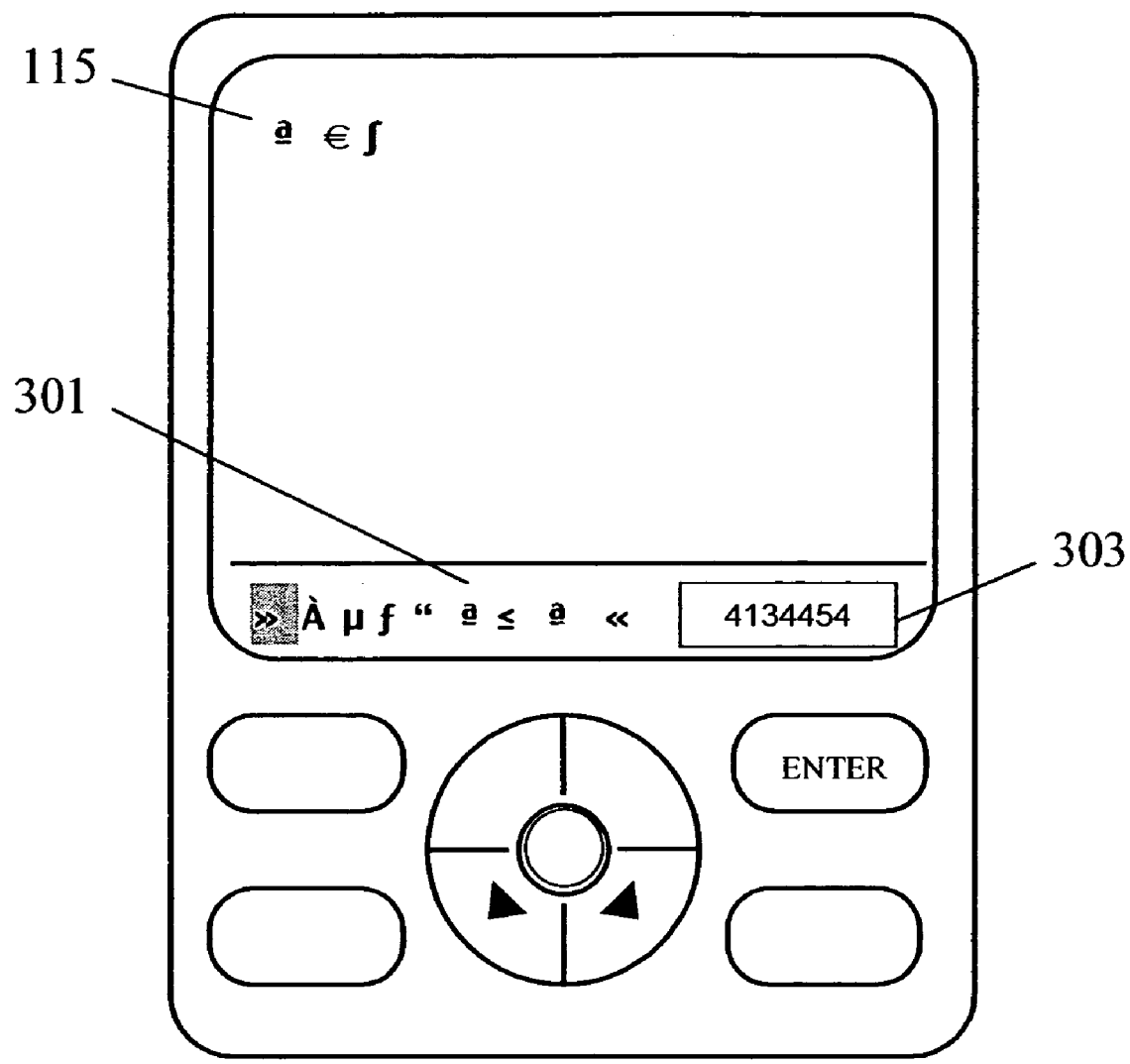
FIG. 26 is a pictorial diagram illustrating an overview of the Chinese input interface where a third desired character is entered without adding any stroke and the fourth desired character appears as the first choice in the default selection list.

After the third desired character (这) is entered, the default selection list 301 based on the last character entered (这) is displayed as shown in FIG. 26. The first choice character (人) of the selection list happens to be the fourth desired character. Therefore, the user may enter it by giving an ENTER command.

The method described above may be carried out by a computer usable medium containing instructions in computer readable form. In other words, the method may be incorporated in a computer program, a logic device, mobile device, or firmware and/or may be downloaded from a network, e.g. a Web site over the Internet. It may be applied in all sorts of text entry.

Although the invention is described herein with reference to some preferred embodiments, one skilled in the art will readily appreciate that other applications may be substituted for those set forth herein without departing from the spirit and scope of the present invention.

Accordingly, the invention should only be limited by the claims included below.

What is claimed is:

1. An apparatus for text entry comprising:
   a joystick member user input device having at least P number of motions, each of which is associated with a signal representing one of P predefined stroke categories;
   a processor coupled to said joystick member;
   at least one memory coupled to said processor, said at least one memory containing at least one database and at least one program used by said processor to process data, said at least one database comprising a number of characters and data of stroke order necessary for each of the characters as well as data of use frequency associated with each of the characters, said stroke order based on said predefined stroke categories; and
   an output member coupled to said processor, said output member comprising a text display area and a selection list display area;
   wherein said at least one program causes said processor to:
   identify a stroke input signal representative of one of said stroke categories, said stroke input signal being associated with a predefined motion of said joystick member;
   display a first selection list when a first stroke is identified, said first selection list comprising first Q number of most frequently used characters that start with said first stroke;
   if the user chooses to enter any character from said first selection list, display said chosen character in said text display area; otherwise,
   display a second selection list when a second stroke is identified, said second selection list comprising first Q number of most frequently used characters that start with said first stroke followed by said second stroke;
   if the user chooses to enter any character from said second selection list, display said chosen character in said text display area; otherwise,
   display a third selection list when a third stroke is identified, said third selection list comprising first Q number of most frequently used characters that start with said first stroke followed by said second stroke and then followed by said third stroke;
   if the user chooses to enter any character in said third selection list, display said chosen character in said text display area; otherwise,
   continue to display a next selection list corresponding to a next stroke added until the user chooses to enter any character from said next selection list;
   concurrently with a stroke input signal being identified, display a numeric or iconic representation of the stroke represented by said stroke input signal; and
   concurrently with a character being entered in said text display area, display a numeric or iconic representation of said character entered; and
   repeat the process for entering a next character.

2. The apparatus of claim 1, wherein said P number is five.

3. The apparatus of claim 2, wherein said five predefined stroke categories are horizontal stroke, vertical stroke, left falling stroke, right falling stroke, and any stroke other than the first four categories.

4. The apparatus of claim 1, wherein said Q number is ten.

5. The apparatus of claim 1, wherein said joystick member comprises at least one motion representing a signal for selecting a character from any of said selection list.

6. The apparatus of claim 1, wherein said joystick member comprises at least one motion representing a signal for entering a chosen character into said text display area.

7. The apparatus of claim 1, wherein said joystick member comprises at least one motion representing a signal for deleting a character entered.

8. The apparatus of claim 1, wherein said joystick member enables the user to define at least one or more motion representing a task executable by said processor.

9. The apparatus of claim 1, wherein said joystick member is an isometric joystick incorporated therein.

10. The apparatus of claim 1, wherein said at least one program further causes said processor to:
    move a visual cue over a desired character in any of said selection list for selecting the desired character in response to a signal representing the user's action to select the desired character, said action to select being either a button pressing or a predefined motion of said joystick member; and
    put the selected character in said text display, area in response to a signal representing the user's action to enter the selected character, said action to enter being either a button pressing or a predefined motion of said joystick member.

11. The apparatus of claim 10, wherein said visual cue is a bitmap in any shape and in any size not larger than the space of a character displayed in said selection list display area.

12. The apparatus of claim 10, wherein said at least one program further causes said processor to:
    automatically select the first character in any of said selection list.

13. The apparatus of claim 1, wherein said at least one program further causes said processor to:
    display a default selection list before any stroke in put signal is identified or after a punctuation mark or a character is entered, said default selection list comprising the first R number of most frequently used characters.

14. The apparatus of claim 13, wherein said at least one database further comprises data of frequency of each character in said default selection list being used as the first character of a sentence or half-sentence, and wherein before any stroke signal is identified or after a punctuation mark is entered, said at least one program causes said processor to:
    display said default selection list in a first default sequence which is based on frequency of each character in said default selection list being used as the first character of a sentence or half-sentence.

15. The apparatus of claim 13, wherein said at least one database further comprises a number of multi-character words and phrases and data of use frequency associated with each of the multi-character words and phrases, wherein after a character is entered, said at least one program causes said processor to:
append each character in said default selection list to said entered character to make a two-character combination:
check each two-character combination against said at least one database;
if no word or phrase whose first two characters matches each two-character combination is found, display said default selection list in a second default sequence which is based on use frequency of each character in said default selection list; and
if some words or phrases whose first two characters matches said two-character combination are found, display said default selection list in a sequence determined by:
prioritizing a matching character whose corresponding two-character combination has matching words or phrases over a non-matching character whose corresponding two-character combination has no matching words or phrases;
prioritizing all matching characters based on use frequency of each corresponding matching word or phrase; and
prioritizing all non-matching characters based on use frequency of each non-matching character.

16. The apparatus of claim 13, wherein said R number is ten.

17. The apparatus of claim 1, wherein said at least one database further causes said processor to:
before any stroke input signal is identified or immediately after a punctuation mark is entered, display a first default selection, list which comprises the ten characters that are most frequently used as the first character of a sentence or a half-sentence in a sequence based on use frequency;
after a character is entered and before a next stroke input signal is identified, display a second default selection list which comprises the first ten most frequently used characters, the sequence of which being based on:
use frequency of each character in the second default list, if no contextual relationship between the character entered and any character in the second default list can be established, or
contextual association value of each character in the second default list.

18. The apparatus of claim 1, wherein said at least one database further comprises a number of multi-character words or phrases and data of use frequency associated with each of the multi-character words or phrases, wherein in response to a stroke input signal representing a stroke added, said at least one program causes said processor to:
obtain a character list comprising first Q number of most frequently used characters that satisfy the stroke ordinal number and the corresponding stroke category of said stroke added, and the stroke ordinal numbers and the corresponding stroke categories of air strokes previously added;
append each character in said character list to the last character entered to make a two-character combination;
check each two-character combination against said at least one database;
if no word or phrase whose first two characters matches said two-character combination is found, display said character list as a selection list in a sequence based on use frequency of each character in said character list; and
if some words or phrases whose first two characters matches said two-character combination are found, display said character list as a selection list in a sequence determined by:
prioritizing a matching character whose corresponding two-character combination has matching words or phrases over a non-matching character whose corresponding two-character combination has no matching words or phrases;
prioritizing all matching characters based on use frequency of each corresponding matching word or phrase; and
prioritizing all non-matching characters based on use frequency of each non-matching character.

19. A method for text entry comprising the steps of:
identifying a stroke input signal representative of one of five predefined stroke categories, said stroke input signal being associated with a predefined motion of a joystick used an input device coupled to a processor which is further coupled to a database and a display device;
as soon as a first stroke for a character is identified, displaying a first selection list in a selection list display area of the display device, said first selection list comprising ten most frequently used characters that start with said first stroke;
if the user chooses to enter any character from said first selection list, displaying said chosen character in a text display area of the display device; otherwise,
displaying a second selection list when a second stroke is identified, said second selection list comprising ten most frequently used characters that start with said first stroke followed by said second stroke;
if the user chooses to enter any character from said second selection list, displaying said chosen character in said text display area; otherwise,
displaying a third selection list when a third stroke is identified, said third selection list comprising ten most frequently used characters that start with said first stroke followed by said second stroke and then followed by said third stroke;
if the user chooses to enter any character in said third selection list, displaying said chosen character in said text display area; otherwise,
continuing to display a next selection list corresponding to a next stroke added until the user chooses to enter any character from said next selection list;
concurrently with a stroke input signal being identified, display a numeric or iconic representation of the stroke represented by said stroke input signal; and
concurrently with a character being entered in said text display area, display a numeric or iconic representation of said character entered; and
repeating above steps for entering a next character.

20. The method of claim 19, wherein said five predefined stroke categories are horizontal stroke, vertical stroke, left falling stroke, right falling stroke, and any stroke other than the first four categories.

21. The method of claim 19, wherein said joystick comprises at least one motion representing a signal for selecting a character from any of said selection list.

22. The method of claim 19, wherein said joystick comprises at least one motion representing a signal for entering a chosen character into said text display area.

23. The method of claim 19, wherein said joystick comprises at least one motion representing a signal for deleting a character entered.

24. The method of claim 19, wherein said joystick enables the user to define at least one motion representing a task executable by the processor.

25. The method of claim 19, wherein said joystick is an isometric joystick.

26. The method of claim 19, further comprising the steps of:
  moving a visual cue over a desired character in any of said selection list for selecting the desired character in response to a signal representing the user's action to select the desired character, said action to select being either a button pressing or a predefined motion of said joystick member; and
  placing the selected character in said text display area in response to a signal representing the user's action to enter the selected character, said action to enter being either a button pressing or a predefined motion of said joystick member.

27. The method of claim 26, wherein said visual cue is a bitmap in any shape and in any size not larger than the space of a character displayed in said selection list display area.

28. The method of claim 26, further comprising the step of:
  automatically selecting the first character in any of said selection list.

29. The method of claim 19, further comprising the step of:
  displaying a default selection list before any stroke input signal is identified or after a punctuation mark or a character is entered, said default selection list comprising the first ten most frequently used characters.

30. The method of claim 29, wherein before any stroke signal is identified or after a punctuation mark is entered, further comprising the step of:
  displaying said default selection list in a first default sequence which is based on frequency of each character in said default selection list being used as the first character of a sentence or half-sentence.

31. The method of claim 29, wherein immediately after a character is entered, further comprising the steps of:
  appending each character in said default selection list to said entered character to make a two-character combination;
  checking each two-character combination against the database;
  if no word or phrase whose first two characters matches each two-character combination is found, displaying said default selection list in a second default sequence which is based on use frequency of each character in said default selection list; and
  if some words or phrases whose first two characters matches said two-character combination are found, displaying said default selection list in a sequence determined by:
    prioritizing a matching character whose corresponding two-character combination has matching words or phrases over a non-matching character whose corresponding two-character combination has no matching words or phrases;
    prioritizing all matching characters based on use frequency of each corresponding matching word or phrase; and
    prioritizing all non-matching characters based on use frequency of each non-matching character.

32. The method of claim 19, further comprising the steps of:
  before any stroke input signal is identified or immediately after a punctuation mark is entered, displaying a first default selection list which includes the ten characters that are most frequently used as the first character of a sentence or a half-sentence in a sequence based on use frequency;
  after a character is entered and before a next stroke input signal is identified, displaying a second default selection list which includes the first ten most frequently used characters, the sequence of which being based on:
  use frequency of each character in the second default list, if no contextual relationship between the character entered and any character in the second default list can be established, or
  contextual association value of each character in the second default list.

33. The method of claim 19, wherein in response to a stroke input signal representing a stroke added, further comprising the steps of:
  obtaining a character list comprising ten most frequently used characters that satisfy the stroke ordinal number and the corresponding stroke category of said stroke added, and the stroke ordinal numbers and the corresponding stroke categories of all strokes previously added;
  appending each character in said character list to the last character entered to make a two-character combination;
  checking each two-character combination against said at least one database;
  if no word or phrase whose first two characters matches said two-character combination is found, displaying said character list as a selection list in a sequence based on use frequency of each character in said character list; and
  if some words or phrases whose first two characters matches said two-character combination are found, displaying said character list as a selection list in a sequence determined by:
    prioritizing a matching character whose corresponding two-character combination has matching words or phrases over a non-matching character whose corresponding two-character combination has no matching words or phrases;
    prioritizing all matching characters based on use frequency of each corresponding matching word or phrase; and
    prioritizing all non-matching characters based on use frequency of each non-matching character,
  continuing to display a next selection list corresponding to a next stroke added until the user chooses to enter any character from said next selection list;
  concurrently with a stroke input signal being identified, display a numeric or iconic representation of the stroke represented by said stroke input signal; and
  concurrently with a character being entered in said text display area numeric or iconic representation of said character entered; and
  repeating above steps for entering a next character.

34. A computer usable medium containing instructions in computer readable form for carrying out a process for Chinese text entry, said process comprising the steps of:
  identifying a stroke input signal representative of one of five predefined stroke categories, said stroke input signal being associated with a predefined motion of a joystick used an input device coupled to a processor which is further coupled to a database and a display device;

as soon as a first stroke for a character is identified, displaying a first selection list in a selection list display area of the display device, said first selection list comprising ten most frequently used characters that start with said first stroke;

if the user chooses to enter any character from said first selection list, displaying said chosen character in a text display area of the display device; otherwise, displaying a second selection list when a second stroke is identified, said second selection list comprising ten most frequently used characters that start with said first stroke followed by said second stroke;

if the user chooses to enter any character from said second selection list, displaying said chosen character in said text display area; otherwise, displaying a third selection list when a third stroke is identified, said third selection list comprising ten most frequently used characters that start with said first stroke followed by said second stroke and then followed by said third stroke;

if the user chooses to enter any character in said third selection list, displaying said chosen character in said text display area; otherwise.

35. The computer usable medium of claim 34, wherein said five predefined stroke categories are horizontal stroke, vertical stroke, left failing stroke, right falling stroke, and any stroke other than the first four categories.

36. The computer usable medium of claim 34, wherein said joystick comprises at least one motion representing a signal for selecting a character from any of said selection list.

37. The computer usable medium of claim 34, wherein said joystick comprises at least one motion representing a signal for entering a chosen character into said text display area.

38. The computer usable medium of claim 34, wherein said joystick comprises at least one motion representing a signal for deleting a character entered.

39. The computer usable medium of claim 34, wherein said joystick enables the user to define at least one motion representing a task executable by the processor.

40. The computer usable medium of claim 34, wherein said joystick is an isometric joystick.

41. The computer usable medium of claim 34, further comprising the steps of:
moving a visual cue over a desired character in any of said selection list for selecting the desired character in response to a signal representing the user's action to select the desired character, said action to select being either a button pressing or a predefined motion of said joystick member; and
placing the selected character in said text display area in response to a signal representing the user's action to enter the selected character, said action to enter being either a button pressing or a predefined motion of said joystick member.

42. The computer usable medium of claim 41, wherein said visual cue is a bitmap in any shape and in any size not larger than the space of a character displayed in said selection list display area.

43. The computer usable medium of claim 41, further comprising the step of:
automatically selecting the first character in any of said selection list.

44. The computer usable medium of claim 34, further comprising the step of:
displaying a default selection list before any stroke input signal is identified or after a punctuation mark or a character is entered, said default selection list comprising the first ten most frequently used characters.

45. The computer usable medium of claim 44, wherein before any stroke signal is identified or after a punctuation mark is entered, further comprising the step of:
displaying said default selection list in a first default sequence which is based on frequency of each character in said default selection list being used as the first character of a sentence or half-sentence.

46. The computer usable medium of claim 44, wherein immediately after a character is entered, further comprising the steps of:
appending each character in said default selection list to said entered character to make a two-character combination;
checking each two-character combination against the database;
if no word or phrase whose first two characters matches each two-character combination is found, displaying said default selection list in a second default sequence which is based on use frequency of each character in said default selection list; and
if some words or phrases whose first two characters matches said two-character combination are found, displaying said default selection list in a sequence determined by:
prioritizing a matching character whose corresponding two-character combination has matching words or phrases over a non-matching character whose corresponding two-character combination has no matching words or phrases;
prioritizing all matching characters based on use frequency of each corresponding matching word or phrase; and
prioritizing all non-matching characters based on use frequency of each non-matching character.

47. The computer usable medium of claim 34, further comprising the steps of;
before any stroke input signal is identified or immediately after a punctuation mark is entered, displaying a first default selection list which includes the ten characters that are most frequently used as the first character of a sentence or a half-sentence in a sequence based on use frequency;
after a character is entered and before a next stroke input signal is identified, displaying a second default selection list which includes the first ten most frequently used characters, the sequence of which being based on:
use frequency of each character in the second default list, if no contextual relationship between the character entered and any character in the second default list can be established, or
contextual association value of each character in the second default list.

48. The computer usable medium of claim 34, wherein in response to a stroke input signal representing a stroke added, further comprising the steps of:
obtaining a character list comprising ten most frequently used characters that satisfy the stroke ordinal number and the corresponding stroke category of said stroke added, and the stroke ordinal numbers and the corresponding stroke categories of all strokes previously added;

appending each character in said character list to the last character entered to make a two-character combination;

checking each two-character combination against said at least one database;

if no word or phrase whose first two characters matches said two-character combination is found, displaying said character list as a selection list in a sequence based on use frequency of each character in said character list; and if some words or phrases whose first two characters matches said two-character combination are found, displaying said character list as a selection list in a sequence determined by:

prioritizing a matching character whose corresponding two-character combination has matching words or phrases over a non-matching character whose corresponding two-character combination has no matching words or phrases;

prioritizing all matching characters based on use frequency of each corresponding matching word or phrase; and prioritizing all non-matching characters based on use frequency of each non-matching character.

* * * * *